US007603948B2

(12) United States Patent
Samanta

(10) Patent No.: US 7,603,948 B2
(45) Date of Patent: Oct. 20, 2009

(54) METHOD AND AN APPARATUS FOR PRINTING SEQUENTIAL CHARACTERS

(75) Inventor: Tarasankar Samanta, Mysore (IN)

(73) Assignee: KBA-Giori S.A., Lausanne (CH)

( * ) Notice: Subject to any disclaimer, the term of this patent is extended or adjusted under 35 U.S.C. 154(b) by 262 days.

(21) Appl. No.: 10/569,117

(22) PCT Filed: Aug. 20, 2004

(86) PCT No.: PCT/IN2004/000254

§ 371 (c)(1),
(2), (4) Date: Jun. 19, 2006

(87) PCT Pub. No.: WO2005/018945

PCT Pub. Date: Mar. 3, 2005

(65) Prior Publication Data

US 2006/0225586 A1 Oct. 12, 2006

(30) Foreign Application Priority Data

Aug. 22, 2003 (IN) .......................... 677/CHE/2003

(51) Int. Cl.
*B41F 33/00* (2006.01)
*G06K 1/12* (2006.01)

(52) U.S. Cl. ............................ 101/76; 101/77; 101/79; 101/93.01

(58) Field of Classification Search ................... 101/76, 101/77, 79, 93.01
See application file for complete search history.

(56) References Cited

U.S. PATENT DOCUMENTS 2,661,896 A * 12/1953 Luhn .......................... 235/1 R
3,107,606 A * 10/1963 Baratelli ...................... 101/88
3,421,752 A * 1/1969 Folino ........................ 270/1.02
4,055,116 A * 10/1977 Roberts et al. ................ 101/79
4,528,905 A * 7/1985 Talbot ......................... 101/76
4,677,910 A 7/1987 Kuhfuss
5,590,507 A 1/1997 Wyssmann
6,755,129 B2 * 6/2004 Schneider et al. ........... 101/483
7,216,583 B2 * 5/2007 Schaede ...................... 101/76

FOREIGN PATENT DOCUMENTS

| | | | |
|---|---|---|---|
| EP | 0 598 679 | A | 5/1994 |
| EP | 1 225 055 | A | 7/2002 |
| EP | 1 389 524 | A | 2/2004 |
| JP | 55 055867 | A | 4/1980 |

* cited by examiner

*Primary Examiner*—Judy Nguyen
*Assistant Examiner*—Leo T Hinze
(74) *Attorney, Agent, or Firm*—Clifford W. Browning; Krieg DeVault LLP

(57) ABSTRACT

The present invention relates to a method and an apparatus for sequential printing of characters. The apparatus is a numbering box with a plurality of numbering wheels viz., unit wheel, tenth wheel, $100^{th}$ wheel, $1000^{th}$ wheel, $10000^{th}$ wheel and $100000^{th}$ wheel which are provided with a combination of ratchet and groove profiles on side-surfaces, numbers engraved on the periphery and are operably interconnected. The $100^{th}$ and $1000^{th}$ wheels provided with a combination of uniquely designed multiple grooves and ratchets. The numbering boxes are arranged in the form of a matrix of maximum rows (mr) and maximum columns (mc), to print first sheet. Thereafter, printing of characters on the second sheet till the next 99 sheets occurs. Finally printing from $101^{st}$ sheet onwards till desired number of sheets is performed after assigning suitable value to first numbering box of $101^{st}$ sheet by using the character profile of $100^{th}$ and $1000^{th}$ wheels.

9 Claims, 12 Drawing Sheets

Fig. : B1.3

100th wheel used in 40 and 20 UPS

1000TH wheel used in 40 ups

1000TH wheel used in 20 ups

METHOD AND AN APPARATUS FOR PRINTING SEQUENTIAL CHARACTERS

This application claims the benefit of co-pending PCT Patent Application Ser. No. PCT/IN2004/000254, filed Aug. 20, 2004, which is now International Publication Number WO 2005/018945, Mar. 3, 2005, which claims priority to India Patent Application No. 677/CHE/03, filed Aug. 22, 2003.

TECHNICAL FIELD

The present invention relates to a method and an apparatus for sequential printing of characters on a medium. The present invention further relates to a method and an apparatus with wheels having unique profile of ratchets and grooves to achieve sequential printing.

BACKGROUND AND PRIOR ART

The main use of numbering is identification, verification and security besides quantifying the amount. Numbering is the simplest method for giving uniqueness to the products manufactured in an identical process. Besides numbering, there can be other ways (e.g. alphabetical sequence or symbols) for giving uniqueness to the final products. But such methods are often found to be complicated and cannot quantify instantaneously.

There are many methods of numbering. The most popularly used is conventional numbering which is suitable for sequential numbering of single identical (token) output of a manufacturing process. The instruments which are used for numbering tokens from minimum to maximum number is called numbering box. Identical numbering boxes can be used in the conventional numbering system for numbering of multi-output processes. Any numbering box can generate any number within the desirable range. Special care has to be taken, so that there is no duplication of numbers in case of multi-products numbering in conventional numbering system.

EP1389524 describes a “Numbering process and numbering box to carry out the process”, the numbering box for typographic numbering in sheet or web fed printing machines, said box numbering with p digits k*n items on said sheets or web for allowing a sequential collecting of said items in the finishing and collating process of layers of q sheets or of a web cut into layers of q sheets, wherein said box carries out a purely sequential actuation for digits 1 to s.

Indian currency notes are printed with 40, 50, 60, 36 etc number of notes on a single sheet at a time. Moreover 100 sequential tokens (notes) are to be packed at the final output and 10 sequential packets will form 1000 sequential notes (tokens), which is called one bundle.

In a conventional system, the numbering pattern for ‘n’ Cycle to produce ‘m’ products per cycle will be as follows:

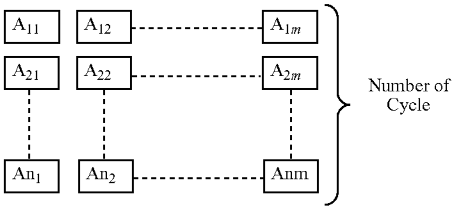

In the above example, the numbering boxes of $A_{11}$ and $A_{12}$ cannot be set serially, because after one cycle $A_{11}$ will be equal to previous setting of $A_{12}$. So after processing of all the cycles, we will get the serial numbering like $A_{11}$, $A_{21}$, $A_{31}$ . . . , $A_{n1}$ and similarly from another column. If $A_{12}$ is set to the next number of $A_{n1}$ then $A_{11}$ to $A_{n2}$ will form the sequence. In this way $A_{11}$ to $A_{nm}$ can form a serial sequence. Hence, in partial processing we will not get serial tokens. Thus we have to wait till the completion of numbering to get all the tokens in serial order. Hence no automation can be implemented for further processing like packing unless all cycle is completed. Hence Conventional System is not suitable for unique sequential numbering of multi tokens output process.

SPaNS (Sequential Packet Numbering System) is another numbering system that was invented to minimize the above drawbacks in the Conventional System. SPaNS is used in the processing of sheets having tokens/packets in the multiple of 10 per sheet. For example fifty packets (for 50 notes per sheet) are obtained after cutting one block (100 sheet) in SPaNS, which will produce 5 bundles. Each bundle having tokens numbered of least significant three digits 001 to 000, as for example, first note number 000001 to $1000^{th}$ note (bottom note of the bundle) number 001000. The above 5 bundles produced from one block are not in sequence. Normally, the above process is done in a decrement pattern that is, from maximum number to minimum number. This is called backward numbering.

From the above two methods bundles in complete sequence cannot be obtained. So even after applying the SPaNS fully sequential bundle are not achieved, which is highly required for further processing like packing. Here manual arrangement is required after completion of cutting of all 20000 sheets (to produce 1000000 notes and 50 notes per sheet). Hence no automation can be implemented between cutting and packing in any similar printing press of the world where sequential bundle packing is required.

Primarily, in order to overcome the limitations as cited above, the numbering system of the present invention is developed. This numbering system is applicable for processing of sheets having tokens (eg. notes) in the multiples of 10 per sheet.

OBJECTS OF THE INVENTION

The primary object of the present invention is to provide a method and an apparatus for sequential printing of characters on a medium.

An object of the present invention is to provide a method and a numbering apparatus with wheels having unique profile of ratchet and grooves to achieve sequential printing.

Another object of the present invention is to provide a method and a numbering apparatus to achieve sequentially numbered bundle of sheets/notes.

Another object of the present invention is to provide a method and a numbering apparatus to achieve sequential numbers by generating unique set of numbers from each of plurality of numbering boxes.

Yet another object of the present invention is to provide a method and a numbering apparatus to completely avoid any manual interference during the sequential process involving printing, cutting and packing.

SUMMARY OF THE INVENTION

The present invention provides a method and an apparatus for sequential printing of characters on a medium like sheets. The apparatus of the present invention is a numbering box having a plurality of numbering wheels which are in turn provided with unique profile of ratchets and grooves to achieve sequential printing and thereby complete automation ranging front Printing, Cutting and packing of media bundles. The numbering wheels are provided with a unique combination of ratchet and groove profiles, said profiles disposed on the side-surfaces of the respective wheels. The first numbering wheel is a unit wheel with a combination of ratchet and groove profile. The tenth wheel with a combination of a grooved and a non-grooved ratchet. The $100^{th}$ and $1000^{th}$ wheels provided with a combination of uniquely designed multiple grooves and ratchets. The $10000^{th}$ and 100000 wheels are provided with a single grooved ratchet. The wheels of the numbering box are operably interconnected by means of actuating pawls. The present invention also provides a method for sequential printing of characters, wherein the desired sequential initialization of characters/numbers that are required to be printed on a sheet initially is performed by suitably adjusting printing face of the numbering wheels of all numbering boxes. The numbering boxes are arranged in a unique combination in the form of a matrix of maximum rows (mr) and maximum columns (mc), to print on the first sheet. Printing of numbering boxes is performed row wise starting from first row (i.e., row mr). After printing the first sheet, the numbering boxes are actuated and the printing faces of the wheel change according to the profiles of the ratchet and grooves. Thereafter printing of characters on the second sheet occurs and printing is continued for next 99 sheets. After $100^{th}$ sheet the first number box of the $101^{st}$ sheet is assigned a suitable value by using the character profile of $100^{th}$ and $1000^{th}$ wheels. Finally, printing of sheets from $101^{st}$ sheet onwards is performed till desired maximum number of sheets is printed, to obtain sequential numbered bundles; said sequence from $101^{st}$ sheet is according to last numbering box of the $100^{th}$ sheet.

DETAILED DESCRIPTION OF THE INVENTION

The present invention provides a method and a numbering apparatus with wheels having unique profile of ratchets and grooves to achieve sequential printing of characters on sheets. By adopting the method of the present invention the steps of printing, cutting and packing is totally automated.

Figure 1:
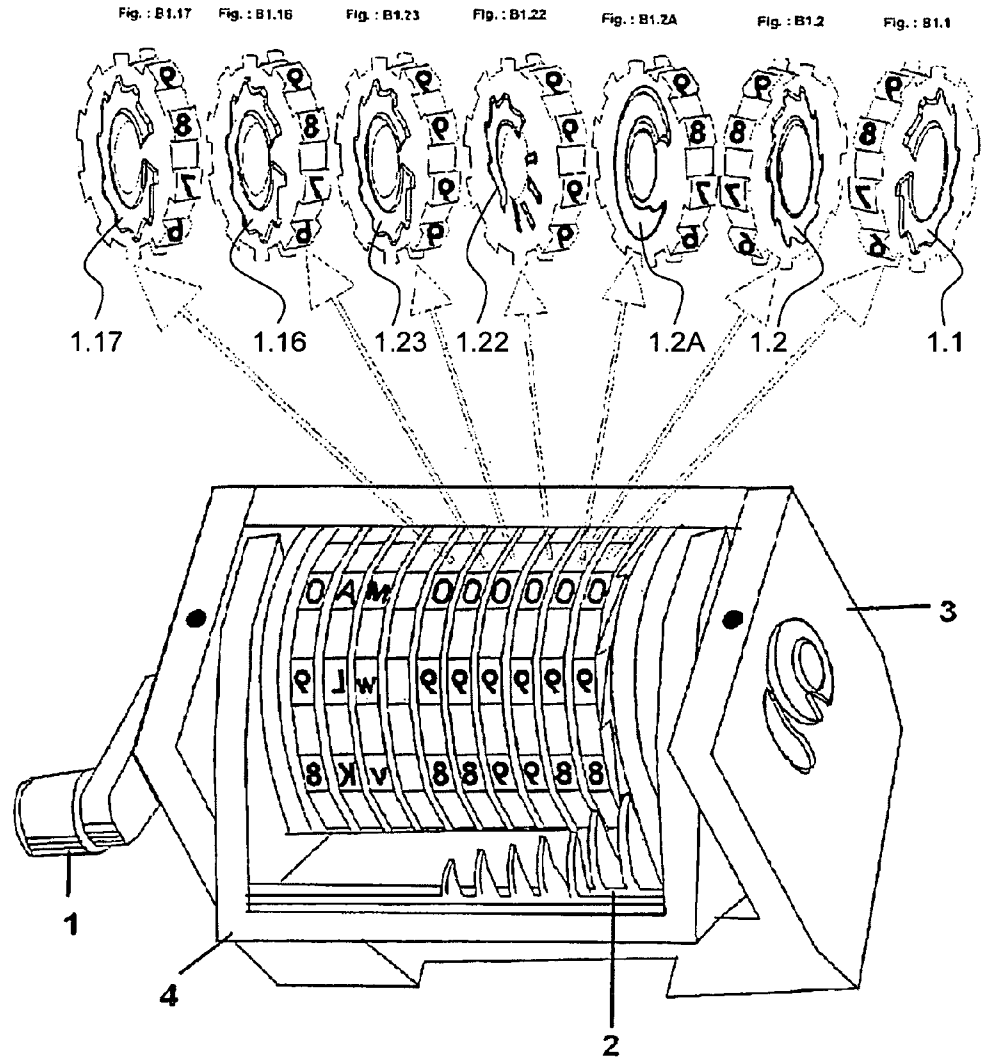
FIG. 1 depicts the numbering box apparatus of the present invention
Figure 2A:
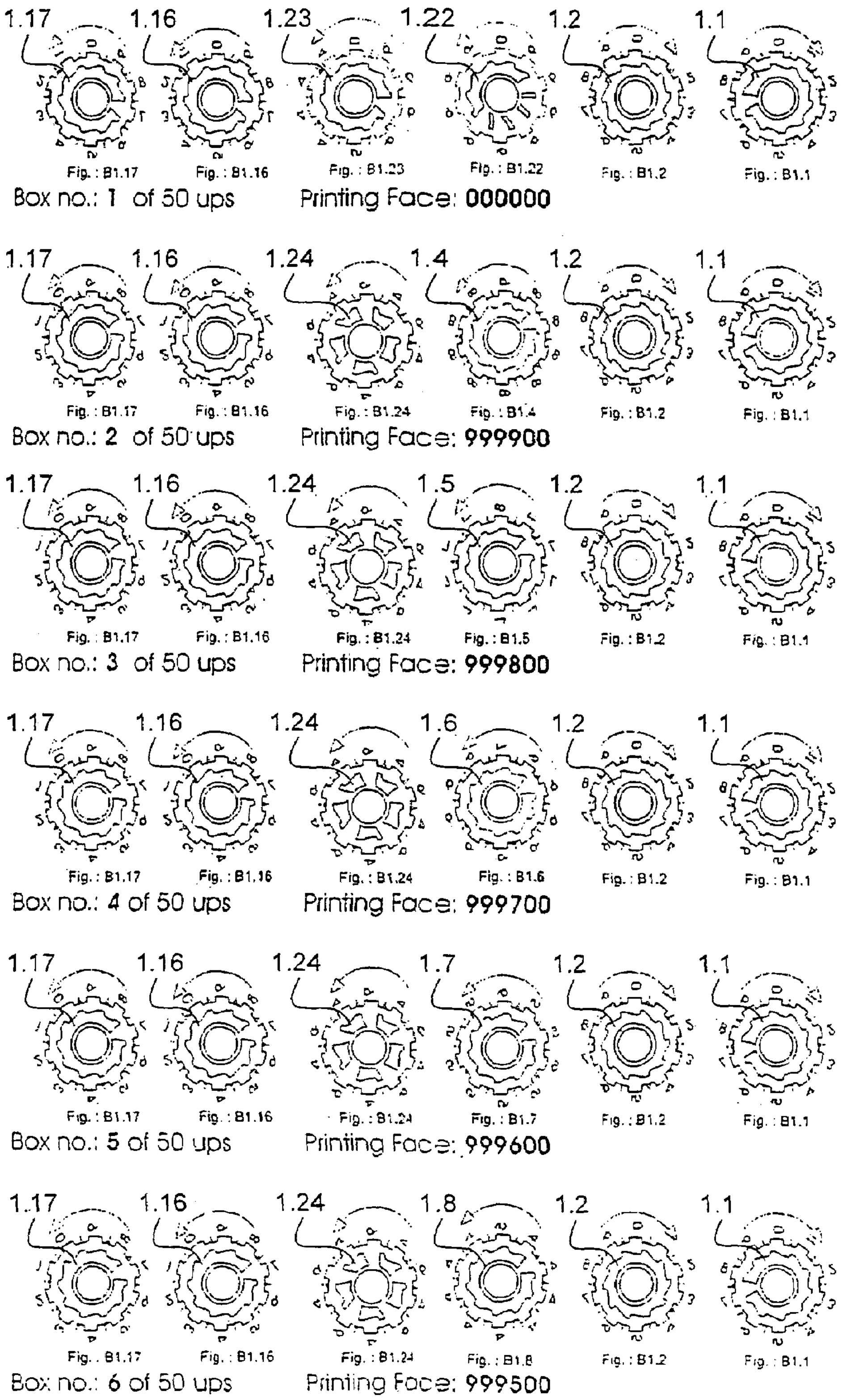
FIG. 2, which is provide in continuous series, depicts an exemplary embodiment of ratchet and groove profiles of wheels of the numbering box for printing 50 up sheets
Figure 2B:
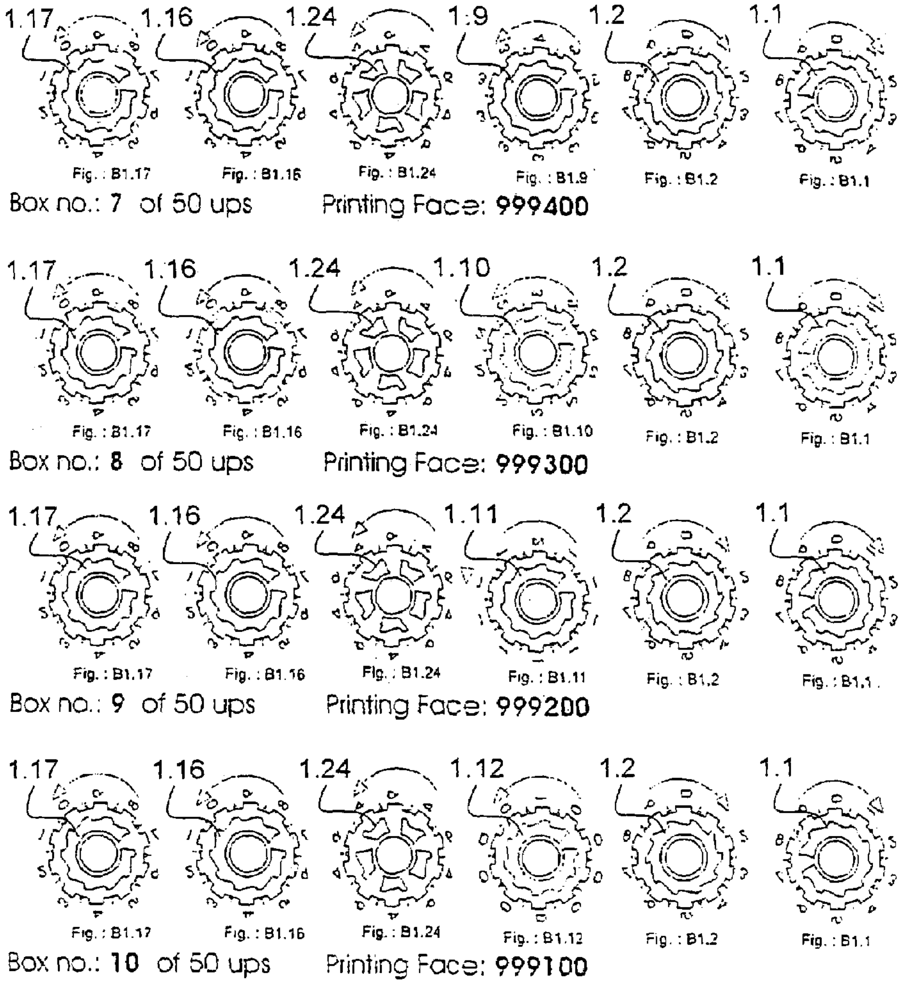
Figure 2C:
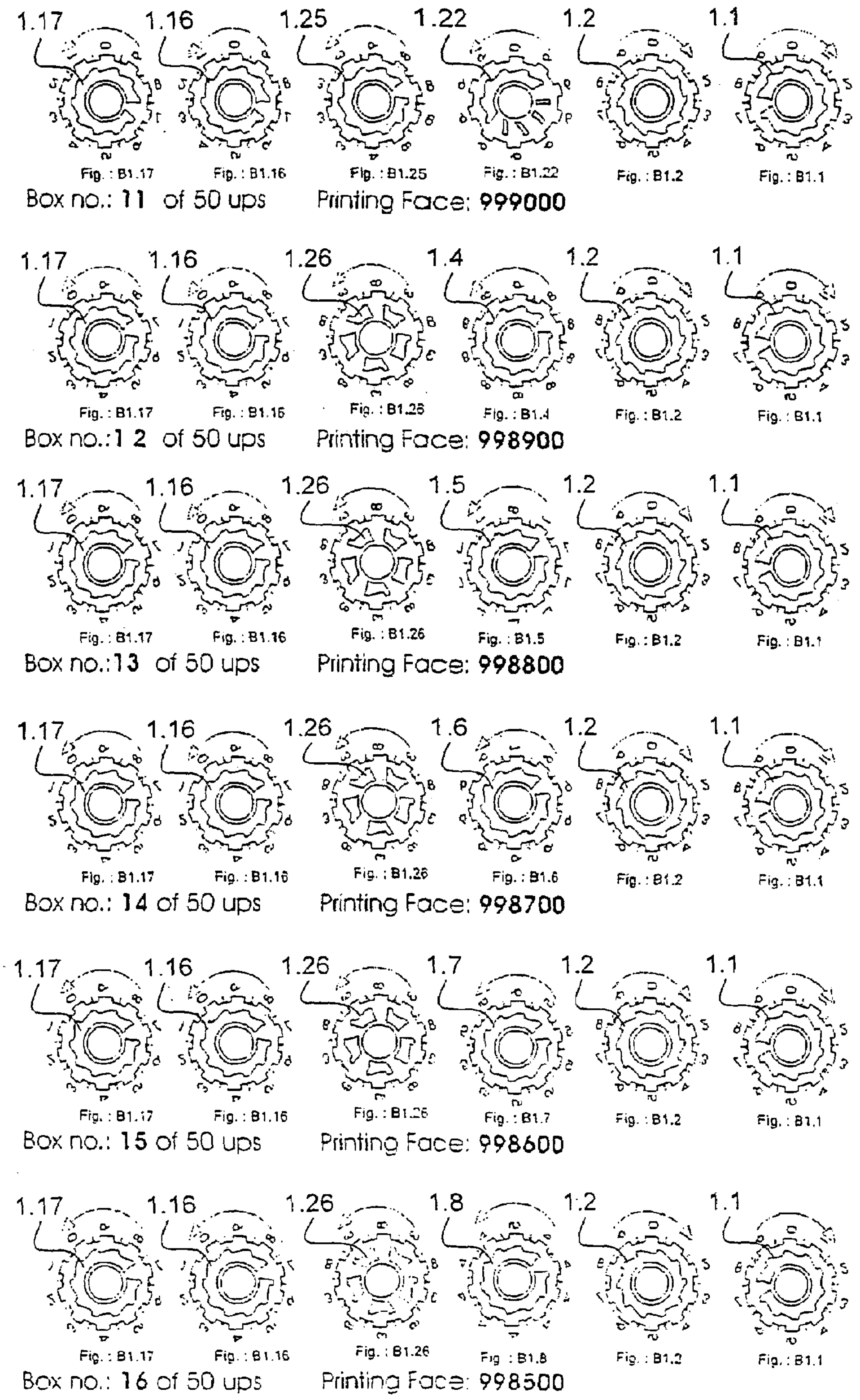
Figure 2D:
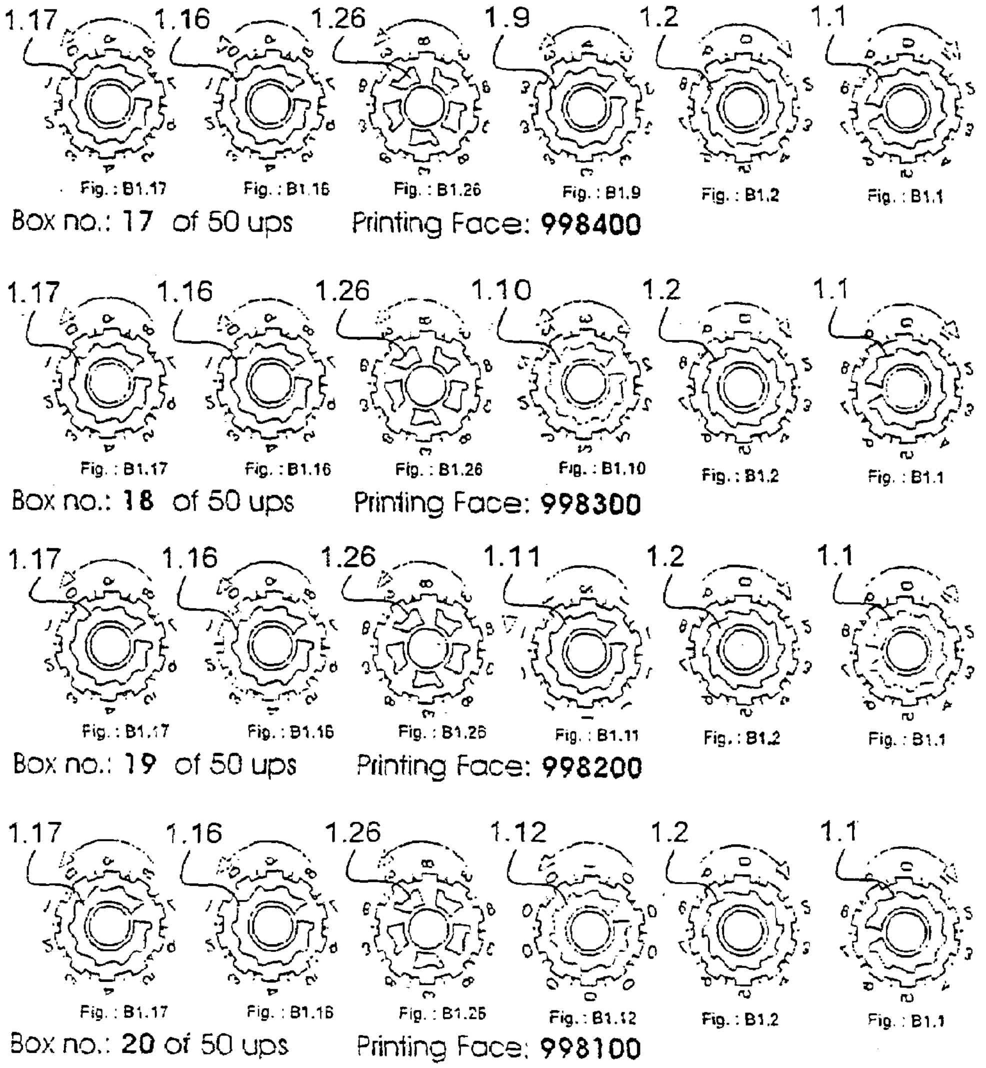
Figure 2E:
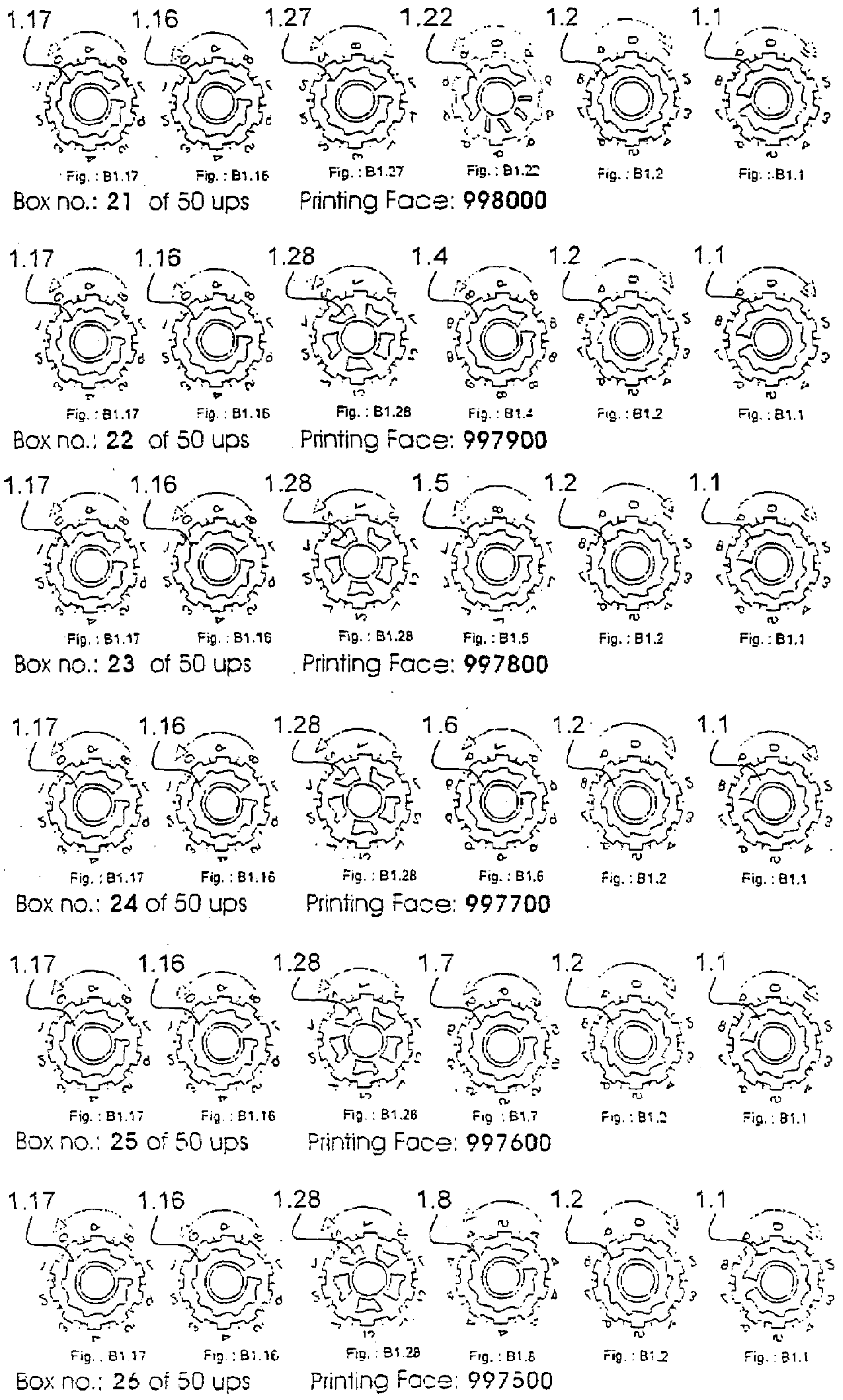
Figure 2F:
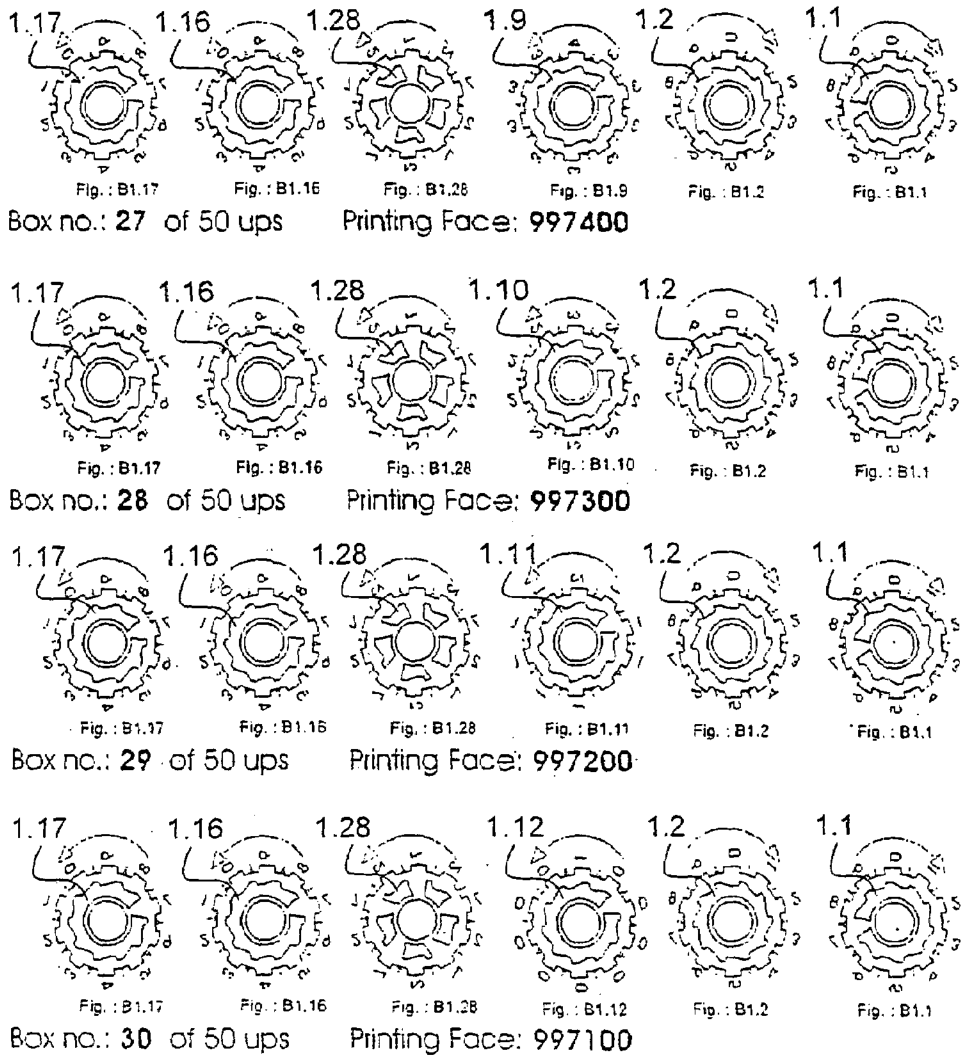
Figure 2G:
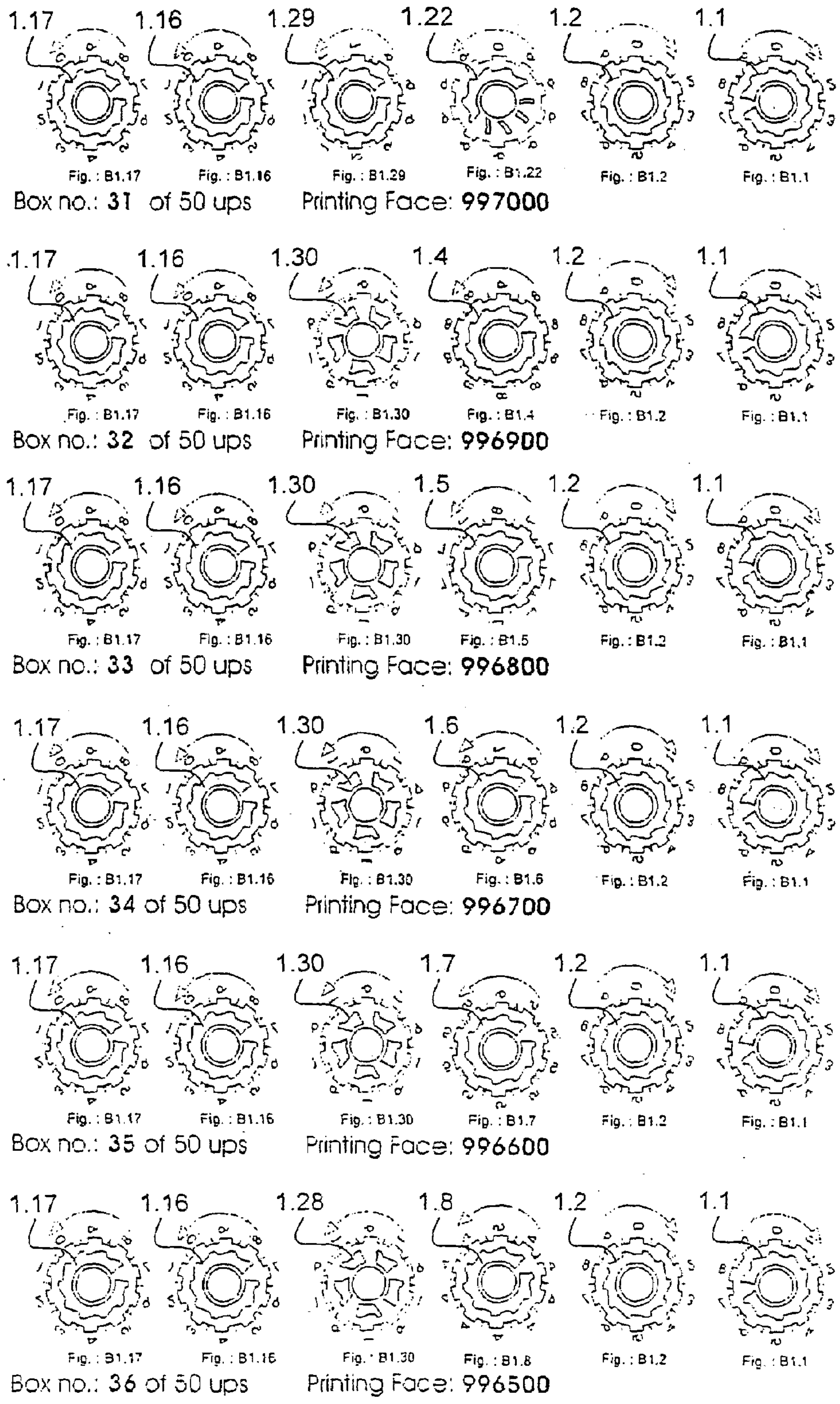
Figure 2H:
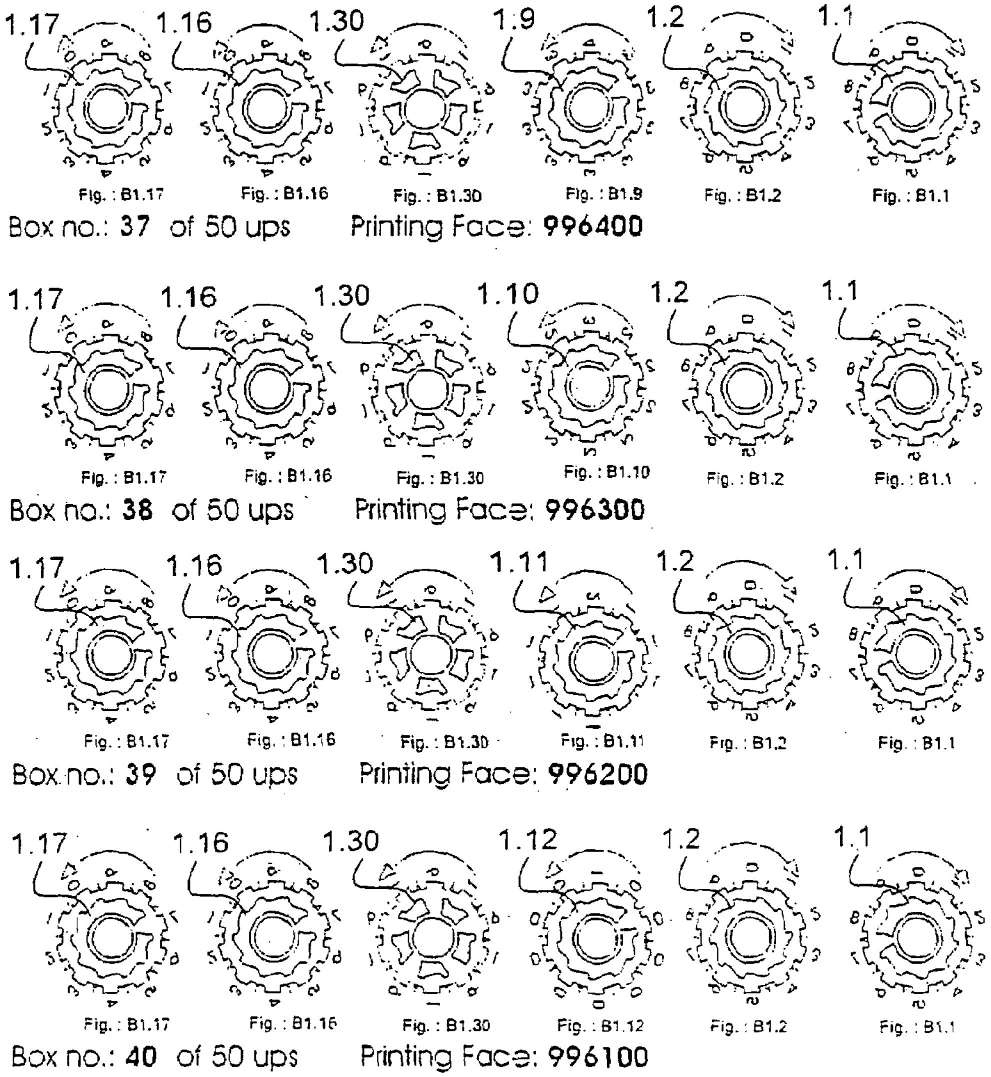
Figure 2I:
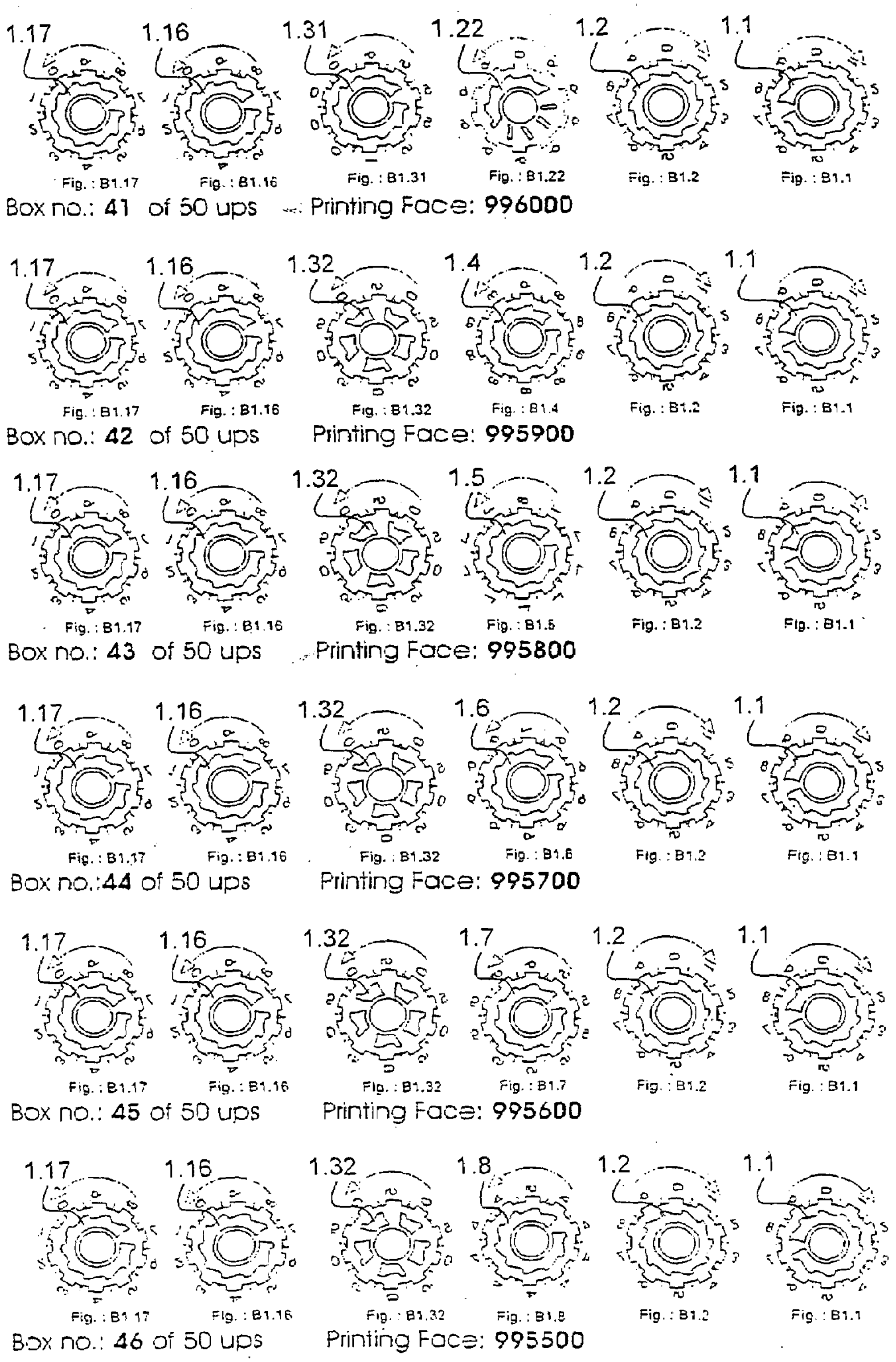
Figure 2J:
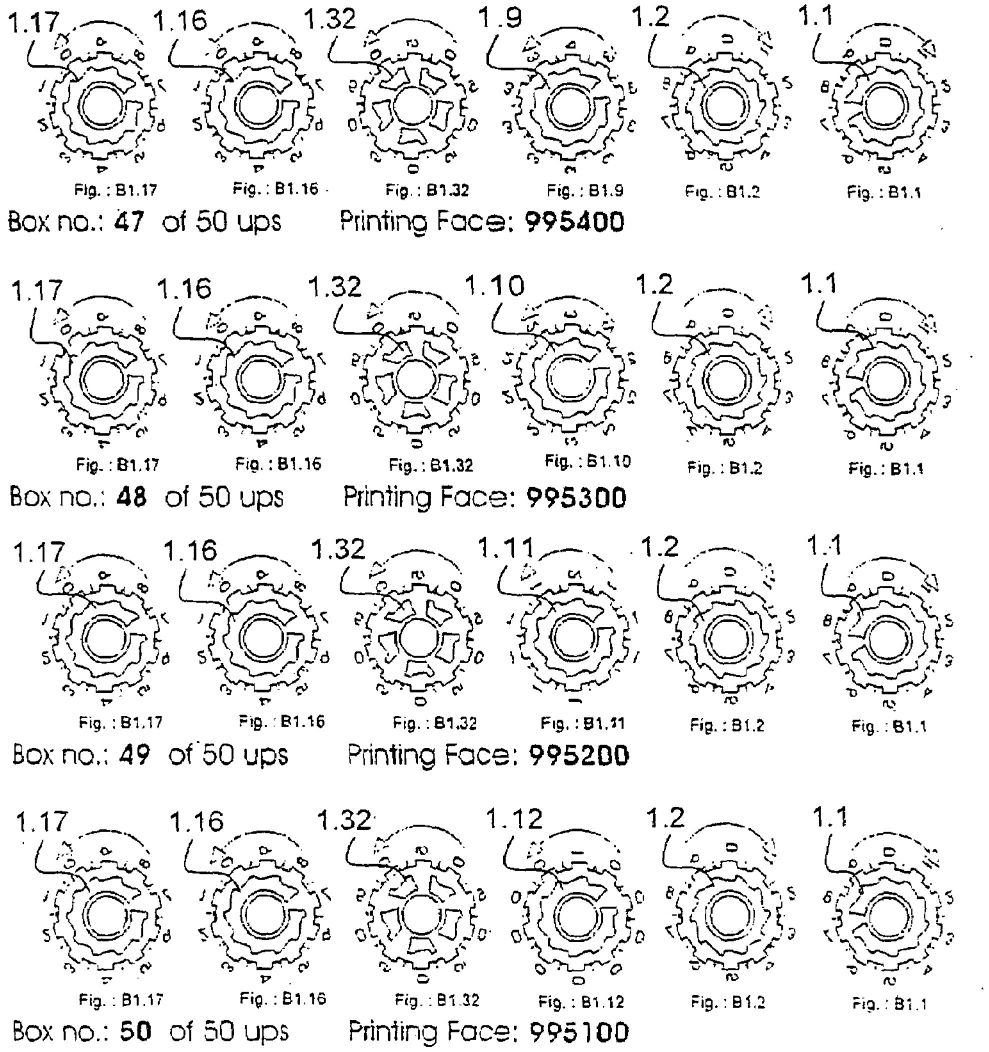

The preferred embodiments of the present invention are explained in conjunction with the accompanied diagrams. The present invention provides a numbering apparatus for sequential printing of characters. The numbering apparatus comprises a plurality of numbering wheels. An external view of a single numbering box unit is shown in FIG. 1. The numbering box of the present invention comprises an outer casing (3) which is made out of hard metal and this casing (3) accommodates the entire numbering box assembly. The side walls of the casing (3) have a circular slot driven through them at the center. A crank housing (4) which is made up of hard metal is placed within the casing (3). The crank housing (4) is dimensionally adjusted so as to fit perfectly within the casing (3). Circular slots are disposed in the crank housing (4) so as to be in perfect alignment with the circular slots of the side walls of the casing (3). A metallic cylindrical shaft member is disposed within the crank housing (4) extending from the circular slot of one side wall of the crank housing (4) to the circular slot of the other side wall of the crank housing (4). A plurality of numb ring wheels is mounted on the cylindrical shaft member. The wheels are mounted on the shaft with a slide fit, which enables friction free rotation of the wheels along with the shaft. The wheels are circular in shape having ten digits (characters) engraved on the periphery of each wheel. The mirror images of the required digits are engraved on the periphery of each wheel, as per the required sequence. The plurality of numbering wheels will be in use depending on the application. For example, to print one million note pieces minimum six numbering wheels are used, to number from 000000 to 999999. The $1000000^{th}$ note is produced in different process or one additional wheel may be incorporated for the same. For the above numbering, the numbering box shall have 6 numbering wheels i.e. from unit wheel to 1 lakh wheel. In practice, each numbering box is provided with 6 numbering wheels, 1 blank wheel, 3 prefix wheels. The prefix wheels may be numeric or an alphabet. The prefix wheels are fixed through out the numbering of the million notes. These prefix wheels are of both numeric and alphabet type and are used according to denomination. The format of numbering of any currency note, cheque or any other documents wherever there is a requirement of generating numbers in sequence is generally as follows:

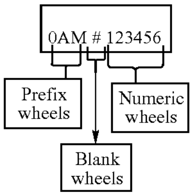

According to the wheel structure the prefix wheels are normally in three categories (a) Numeric: These wheels are having ten numeric digits 0,9,8,7,6,5,4,3,2,1, (b) Alphabetic-I: These wheels are having alphabets of A,B,C,D,E,F,G,H, K,L and (c) Alphabetic-II: These wheels are having alphabets of M,N,P,Q,R,S,T,U,V,W. Any combination of the above may be made according to the application. The above said digits and alphabets are generally called Characters. Mirror image of these characters is engraved always on the wheel but leading edge of these characters will be placed nearer to the next lower digit or away from lower digit depending on the direction of document flow. The relative position of the all wheels depends on the document flow as well as requirement. Each of the numbering wheels of the numbering box is depicted externally in the numbering box apparatus of the present invention as shown in FIG. 1.

The first six numbering wheels are mechanically linked. This mechanical link comprises three components viz, the ratchet profile, the groove profile and the actuating pawls (2). The shapes of the ratchet and the groove profiles are uniquely arranged for different numbering wheels. The FIG. 1 as an exemplary embodiment depicting the ratchet and groove profiles of the numbering wheels of a single numbering box-1 out of 50 numbering boxes. The crank housing (4) also comprises a pair of actuating pawls (2). The actuating pawls (2) are spring controlled pivoted catches, and have the function of engaging with the ratchet wheel to prevent reverse motion.

One of the actuating pawls (2) provided with a pair of teeth on it and is called a two-teeth actuating pawl (2) and the other actuating pawl (2) is provided with five teeth on it and is called five-teeth actuating pawl (2). The spring loaded actuating pawls (2) are mounted on the crank housing (4) by means of fastening pins. The apparatus of the present invention showed in FIG. 1, shows a numbering box with actuating lever (1) provided on the left hand side of the numbering box FIG. 1 also shows the actuating pawls (2) at the opposite side or right hand side of the numbering box. In an embodiment of the present invention, the numbering wheels are arranged such that the unit wheel is disposed on the right hand side. However, it is also within the purview of this invention to have a numbering box with actuating lever (1) on the right hand side of the numbering box and the actuating pawls (2) on the left hand side of the numbering box.

The plurality of numbering wheels are disposed on the cylindrical shaft member, in the following sequential manner; with the unit wheel placed at one end followed by the tenth wheel, 100th wheel, 1000th wheel, 10000th wheel and 100000th wheel. Optionally, an additional wheel can also be provided to print an additional character. Each of these numbering wheels is provided with a combination of ratchet and groove profiles disposed on the side surfaces of the numbering wheels. The ratchet and groove profiles disposed on the side surfaces of the numbering wheels are shown in Figs B1.1 to B1.32 of FIGS. 1 to 3 and are labelled with corresponding reference numerals 1.1 to 1.32 respectively. The placement of the grooves on the ratchet depends on the placement of actuating pawl (2) with respect to printing face.

Figure 3:
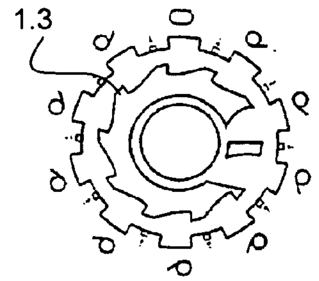
FIG. 3 depicts the additional unique $100^{th}$ and $1000^{th}$ wheels that are required to print 20 and 40 up sheets in addition to the ones depicted in FIG. 2.
Figure 3:
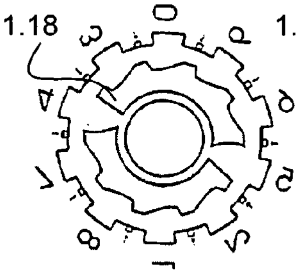
Figure 3:
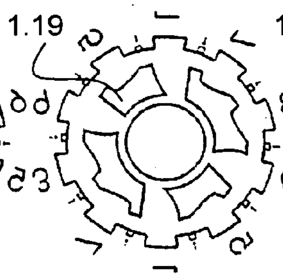
Figure 3:
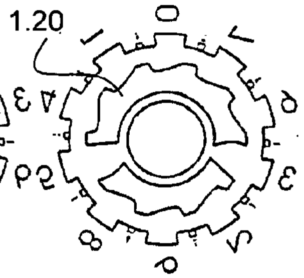
Figure 3:
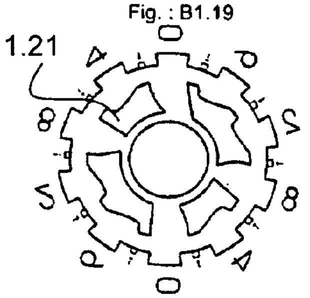
Figure 3:
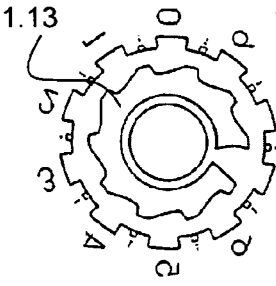
Figure 3:
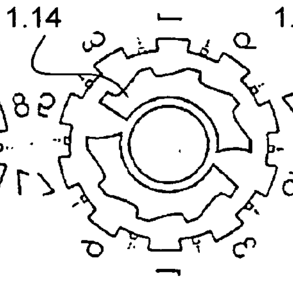
Figure 3:
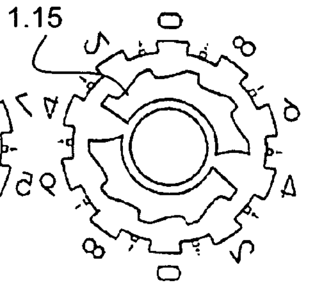

The unit wheel is embossed with a combination of a single groove and a ratchet 1.1 on the right-side of the unit wheel. The unit wheel for all the numbering boxes is same and is shown in Fig. B 1.1 of FIG. 2. The unit wheel is operably connected to the first tooth of the two-teeth actuating pawl (2). Immediately after the unit wheel, the tenth wheel is placed on the cylindrical shaft member. The tenth wheel is a unique wheel and is embossed with a combination of single groove and a ratchet 1.2A on its left side and a non-grooved ratchet 1.2 on its right side. The tenth wheel for all the numbering boxes is same and its right side with the non-grooved ratchet 1.2 is shown in Fig B 1.2 of FIG. 2. The grooved ratchet 1.2A of the tenth wheel is as shown in Fig B 1.2 A shown in FIG. 1. The non-grooved ratchet 1.2 of the tenth wheel is operably connected with the second tooth of the two-teeth actuating pawl (2). The 100th wheel is placed adjacent to the tenth wheel on the cylindrical shaft and is embossed with a combination of multiple grooves and a ratchet on its left side. The 100th having a combination of multiple grooves and a ratchet is as shown in Figs B.1.4, B 1.5,B 1.6, B 1.7, B 1.8, B 1.9, B 1.10, B 1.11, B 1.12, B 1.22 of FIG. 2 with reference numerals 1.4 to 1.12 and 1.22 designating the corresponding ratchet and groove profiles. The other possible type of 100th wheel Fig B1.3 is shown in FIG. 3 with its ratchet and groove profile 1.3. The 100th is operably connected with the second tooth of the five-teeth actuating pawl (2). The 1000th wheel is placed adjacent to the 100th wheel on the cylindrical shaft and is embossed with a combination of multiple grooves and a ratchet on its left side. The types of multiple grooves on the 1000th wheel is shown in Figs B 1.13, B 1.14, B 1.15, B 1.18, B 1.19, B 1.20, B 1.21 (The preceding 7 figures of FIG. 3), B1.23, B.1.24, B 1.25, B 1.26, B 1.27, B 1.28, B 1.29, B 1.30, B 1.31, B1.32 of FIG. 2 with reference numerals 1.13 to 1.15, 1.18 to 1.21 and 1.23 to 1.32 designating the corresponding ratchet and groove profiles. The 1000th wheel is operably connected with the third tooth of the five-teeth actuating pawls (2). The 10000th wheel is placed adjacent to the 1000th wheel on the cylindrical shaft and is embossed with a single grooved ratchet 1.16 on its left side as shown in Fig B 1.16 of FIG. 2. The 10000th wheel is operably connected with the forth tooth of the five-teeth actuating pawl (2). The 100000th wheel is placed adjacent to the 10000th wheel on the cylindrical shaft. The 100000th wheel is operably connected with the fifth tooth of the five-teeth actuating pawl (2) and is provided with a ratchet and a single groove 1.17 on its left side as shown in Fig B 1.17 of FIG. 2.

It is also an embodiment of the present invention, a method wherein printing sequential characters is described. The method of printing characters is performed using the numbering box apparatus of the present invention. By referring to FIGS. 1, 2 & 3, a plurality of numbering boxes is used to achieve said sequential printing and said plurality of numbering boxes is arranged in a matrix made up of rows and columns. The matrix is made of maximum rows (mr) and maximum columns (mc). The value mr indicates the maximum number of rows that are present in the matrix and mc indicates the maximum number of columns that are present in the matrix. The combination of mr rows and mc columns can be arranged in a matrix to form 50 or 40 or 20 numbers. The value of mr and mc will depend on the system used. In case of a system to print 50 numbers on a sheet, the various combinations of values of mr and mc can be, mr=5 and mc=10 or mr=10 and mc=5 or mr=25 and mc=2 or mr=2 and mc=25. The present embodiment utilizes the matrix of mr value 10 and mc value 5. However, it is within the purview of this invention, to have different desired values for maximum number of rows and columns as per the requirement of a user, by suitably modifying the matrix.

Accordingly, for instance, in case of a requirement to print 40 set of numbers on a sheet, the values of mr and mc are mr=5 and mc=8 or mr=8 and mc=5 or mr=10 and mc=4 or mr=4 and mc=10 or mr=20 and mc=2 or mr=2 and mc=20 respectively. Similarly, in case of a system to print 20 set of numbers on a sheet, the values of mr and mc are mr=2 and mc=10 or mr=10 and mc=2 or mr=5 and mc=4 or mr=4 and mc=5 respectively.

The method of present invention is explained by considering a requirement to print 50 set of numbers on a sheet. Therefore, the values of mr and mc used in the present system are mr=10 and mc=5 respectively. The numbering boxes in every cell of the matrix are unique i.e. numbers generated from any one numbering box cannot be generated by any other boxes. For instance, if there is a printing requirement for 20 and 40 up sheets, in addition to the unique numbering wheels as shown in FIG. 2, the $100^{th}$ and $1000^{th}$ wheels are substituted for the corresponding $100^{th}$ and $1000^{th}$ wheels of FIG. 3. This is applicable to the system to print 20, 40 as well as 50 set of numbers on a sheet.

The arrangement of the numbering boxes (50 ups) of the present invention in a matrix form is depicted in the Table 1:

TABLE 1

| | | | | |
|---|---|---|---|---|
| Box 50 | Box 40 | Box 30 | Box 20 | Box 10 |
| Box 49 | Box 39 | Box 29 | Box 19 | Box 09 |
| Box 48 | Box 38 | Box 28 | Box 18 | Box 08 |
| Box 47 | Box 37 | Box 27 | Box 17 | Box 07 |
| Box 46 | Box 36 | Box 26 | Box 16 | Box 06 |
| Box 45 | Box 35 | Box 25 | Box 15 | Box 05 |
| Box 44 | Box 34 | Box 24 | Box 14 | Box 04 |
| Box 43 | Box 33 | Box 23 | Box 13 | Box 03 |
| Box 42 | Box 32 | Box 22 | Box 12 | Box 02 |
| Box 41 | Box 31 | Box 21 | Box 11 | Box 01 |

The numbering boxes (for 50 ups) are arranged in the matrix to print first sheet. The arrangement of the numbering boxes in the matrix is also done in the following sequence. The first numbering box is disposed at matrix location of (mr)×(mc), thereafter the second numbering box is disposed at matrix location of (mr−1)×(mc). The next consecutive numbering boxes are disposed in succeeding matrix locations from the second numbering box. The $(mr-10)^{th}$ numbering box is disposed at matrix location of (mr)×(mc−1). Thereafter, the next consecutive numbering boxes are disposed by performing the above steps of disposing the first, second and consecutive numbering boxes iteratively, till the disposition of last numbering box. The last numbering box is disposed at the matrix location of (mr−9)×(mc−4).

After placing the numbering boxes in the specific sequence as provided above, a pre-determined initial value of the numbering wheels, to print the initial sequence of numbers on the first sheet is manually set for all the numbering boxes. These numbering wheels range from the unit wheel to $100000^{th}$ wheel. The adjacent numbering boxes in the matrix are set to a value (numerical sequential value) difference of 100 row wise and a value difference of 1000 column wise from each other. The numbering box in each column of the matrix will have a value difference of 1000 from the numbering box in the adjacent column of the matrix and the numbering box in each row of the matrix will have a value difference of 100 from the numbering box in the adjacent row of the matrix.

After the initial setting of all the numbering boxes is done, then printing of the numbering boxes is performed. The printing of characters of the numbering boxes is performed initially on the first sheet by positioning and striking the respective wheels of the numbering boxes onto the sheet of paper placed below the numbering boxes. This printing is executed by simultaneous printing of all numbering boxes of (mr) row initially and then all numbering boxes of (mr−1) row and thereafter till (mr−9) row. The printing is performed row wise with each row printed at a given point of time. Subsequently, the numbering boxes of the next row i.e. the second row or $(m-1)^{th}$ row are printed. This printing sequence is continued row-wise till all the numbering boxes in the last row or $(mr-9)^{th}$ row are printed. On completion of printing of the numbering boxes of the last row of the matrix, the printing of characters on the second sheet is initiated. Prior to the printing of the second sheet the numbering boxes are actuated row-wise by means of an actuating lever (1). On actuation, the number values on the numbering wheels are decremented by 1 and the $2^{nd}$ sheet is printed. By following the steps of further actuation of numbering boxes, the printing of next series sheets is performed till the completion of next 99 sheets.

Actuation Process

The actuation of the numbering wheels occurs in a conjunction to each other. The actuation of the wheels is achieved by means of actuating pawls (2). The numbering wheels are operably interconnected to one another by means of actuating pawls to provide pre-determined decremental sequential numbering actuation. The pre-determined sequential numbering actuation occurs by means of a combination of actuating pawls and the ratchet and groove profiles. There are two actuating pawls (2), the first actuating pawl (2) is a two-teeth actuating pawl (2) and the second is a five-teeth actuating pawl (2). During actuation, the actuating lever (1) of the numbering box is actuated. The actuation of the actuating lever of the numbering box is transmitted initially to the two-teeth actuating pawl (2). On receiving the actuation, the first tooth of the two-teeth actuating pawl (2) engages with the ratchet of the unit wheel. The unit wheel rotates by one number on being pushed by the first tooth of the two-teeth actuating pawl (2). This rotation of the unit wheel takes place for every actuation of the actuating lever (1). The unit wheel comprises characters (numbers) ranging from 0 to 9 engraved on its surface. On exhaustion of range of numbers on the unit wheel i.e. changing over of the unit wheel from 0 to 9, the first tooth of the two-teeth actuating pawl (2) enters the groove of the unit wheel. The second tooth of the two-teeth actuating pawl (2) is operably connected to the first tooth of the two-teeth actuating pawl (2), to engage and rotate the tenth wheel by one number. The tenth wheel rotates by a single number on every change over of the unit wheel from 0 to 9. When the tenth wheel holds 0 as the value on its printing face, the first tooth of the five-teeth actuating pawl (2) operably enters into the groove of the tenth wheel and the second tooth of the five-teeth-actuating pawl (2) actuates the hundredth wheel. The $100^{th}$ wheel rotates by one number when the tenth wheel holds 0 and when the tenth wheel is not holding 0 the $100^{th}$ wheel is fixed and non-rotating. On changing over of $100^{th}$ wheel from 0 to 9 or 9 to 0 or from n to n+1 or additional rotation with 9 if required to accommodate ten digits on one wheel, the second tooth of the five-teeth-actuating pawl (2) enter the groove of the $100^{th}$ wheel for printing 50 numbering boxes. On changing over of characters of the $100^{th}$ wheel either from 0 to 9 or from 9 to 0 or from n to (n+1), the second tooth of the five-teeth-actuating pawl (2) enters the groove of the $100^{th}$ wheel for printing 20 and/or 40 numbering boxes. Here, the value of n is selected from 0, 1, 2, 3, 4, 5, 6, 7, or 8. When the second tooth of the five-teeth actuating pawl (2) enters into the groove of the $100^{th}$ wheel, the third tooth of the five-teeth actuating pawl (2) actuates the $1000^{th}$ wheel. On changing over of the $1000^{th}$ wheel from 0 to 9 or from 4 to 9 or from 3 to 9 or from 3 to 8 or from 2 to 8 or from 2 to 7 or from 1 to 7 or from 1 to 6 or from 0 to 6 or from 0 to 5 for 50 up sheets or from 1 to 8 or from 0 to 9 or from 1 to 7 or from 3 to 9 or from 0 to 7 or from 2 to 9 or from 0 to 6 or from 2 to 8 for 40 up sheets or from 0 to 9 or from 1 to 9 or from 0 to 8 for 20 up sheets, the third tooth of the five-teeth-actuating pawl (2) enters the groove of the $1000^{th}$ wheel. When the third tooth of the five-teeth actuating pawl (2) enters into the groove of the $1000^{th}$ wheel, the forth tooth of the five-teeth actuating pawl (2) actuates the $10000^{th}$ wheel. On changing over of the $10000^{th}$ wheel from 0 to 9, the forth tooth of the five-teeth actuating pawl (2) enters the groove of the $10000^{th}$ wheel. When the forth tooth of the five-teeth actuating pawl (2) enters into the groove of the $10000^{th}$ wheel, the fifth tooth of the five-teeth actuating pawl (2) actuates the 100000 wheel. On changing over of the $100000^{th}$ wheel from 0 to 9 the $1000000^{th}$ wheel is actuated (if there is any).

The rotation of higher order wheel depends on the change over of the just next lower order wheel e.g. rotation of $10^{th}$ wheel depends on the change over of unit wheel. The unit wheel ratchet which faces the frame of the numbering box gets actuated when the actuating lever (1) is actuated. In turns the actuating lever (1) actuates the crank housing (4), leading the spring-loaded two-teeth actuating pawls (2) to engage with the unit wheel. On the opposite side of the numbering wheels spring loaded retaining pawls permits only a single rotation of a numbering wheel during actuation. The curvature of the ratchet grooves correspond to the curvature of the actuating pawl. The unit wheel will be actuated at every actuation of the actuating lever (1). The actuating lever is disposed on either side of the numbering box.

The result of printing boxes of the present invention for the first sheet that is printed using 50 numbering boxes is shown below in Table 2,

TABLE 2

| | | | | |
|---|---|---|---|---|
| 995100 | 996100 | 997100 | 998100 | 999100 |
| 995200 | 996200 | 997200 | 998200 | 999200 |
| 995300 | 996300 | 997300 | 998300 | 999300 |
| 995400 | 996400 | 997400 | 998400 | 999400 |
| 995500 | 996500 | 997500 | 998500 | 999500 |
| 995600 | 996600 | 997600 | 998600 | 999600 |
| 995700 | 996700 | 997700 | 998700 | 999700 |
| 995800 | 996800 | 997800 | 998800 | 999800 |
| 995900 | 996900 | 997900 | 998900 | 999900 |
| 996000 | 997000 | 998000 | 999000 | 1000000 |

The $100^{th}$ sheet that is printed using 50 numbering boxes is shown in Table 3

TABLE 3

| | | | | |
|---|---|---|---|---|
| 995001 | 996001 | 997001 | 998001 | 999001 |
| 995101 | 996101 | 997101 | 998101 | 999101 |
| 995201 | 996201 | 997201 | 998201 | 999201 |
| 995301 | 996301 | 997301 | 998301 | 999301 |
| 995401 | 996401 | 997401 | 998401 | 999401 |
| 995501 | 996501 | 997501 | 998501 | 999501 |
| 995601 | 996601 | 997601 | 998601 | 999601 |
| 995701 | 996701 | 997701 | 998701 | 999701 |
| 995801 | 996801 | 997801 | 998801 | 999801 |
| 995901 | 996901 | 997901 | 998901 | 999901 |

On completion of printing on the $100^{th}$ sheet, the $101^{st}$ sheet is to be printed. Before printing on the $101^{st}$ sheet, the first numbering box is assigned a new value. This assignment is performed by using the character profile of $100^{th}$ and $1000^{th}$ wheels. The value that is assigned to the first numbering box is obtained by decrementing the value in the numbering box at the matrix location (mr−9)×(mc−4) of the $100^{th}$ sheet by 1. Thereafter the first numbering box of the $101^{st}$ sheet will contain the value of the last numbering box of the $100^{th}$ sheet, subtracted by 1.

The values of all other numbering boxes is obtained using the same logic used above for assigning values to the numbering boxes of the first sheet.

On printing the $101^{st}$ sheet all the steps of printing and actuation are performed repeatedly as described above, till the desired number of sheets is printed.

The character, ratchet and groove profiles of the $100^{th}$ wheel is as shown in Fig B1.22, B.1.4, B 1.5, B 1.6, B 1.7, B 1.8, B 1.9, B 1.10, B 1.11, B 1.12 of FIG. 2, where the matrix configuration is mr=10 and mc=5. The character, ratchet and groove profiles of the $100^{th}$ wheel, is as shown in Fig B1.3 (FIG. 3), B.1.4, B 1.5, B 1.6, B 1.7, B 1.8, B 1.9, B 1.10, B 1.11, B 1.12 of FIG. 2, where the matrix configuration is mr=8 and mc=5. The character, ratchet and groove profiles of the $100^{th}$ wheel, is as shown in Fig B1.3 (FIG. 3), B.1.4, B 1.5, B 1.6, B 1.7, B 1.8, B 1,9, B 1.10, B 1.11, B 1.12 of FIG. 2, where the matrix configuration is mr=10 and mc=2. The character, ratchet and groove profiles of the $1000^{th}$ wheel, is as shown in Fig B1.23, B.1.24, B 1.25, B 1.26, B 1.27, B 1.28, B 1.29, B 1.30, B 1.31, B 1.32 of FIG. 2, where the matrix configuration is mr=10 and mc=5. The character, ratchet and groove profiles of the $1000^{th}$ wheel, is as shown in Fig B1.18, B.1.19, B 1.20, B 1.21 of FIG. 3, where the matrix configuration is mr=8 and mc=5. The character, ratchet and groove profiles of the $1000^{th}$ wheel, is as shown in Fig B1.13, B1.14, B1.15 of FIG. 3, where the matrix configuration is mr=10 and mc=2.

After the first 100 sheets are printed, the 5 bundles having the sequential note numbers as described below are formed.

| $5^{th}$ Bundle | $4^{th}$ Bundle | $3^{rd}$ Bundle | $2^{nd}$ Bundle | $1^{st}$ Bundle |
|---|---|---|---|---|
| 995001 to 996000 | 996001 to 997000 | 997001 to 998000 | 998001 to 999000 | 999001 to 1000000 |

After the next 100 sheets are printed, the 5 bundles having the sequential note numbers as described below are formed.

| $10^{th}$ Bundle | $9^{th}$ Bundle | $8^{th}$ Bundle | $7^{th}$ Bundle | $6^{th}$ Bundle |
|---|---|---|---|---|
| 990001 to 199000 | 991001 to 399000 | 992001 to 599000 | 993001 to 799000 | 994001 to 995000 |

Similarly, all other bundles will come out from cutting machine sequentially. Inferring from the above example it is clear that automatic packing machine can be attached with cutting machine easily. Thus the sequence of printing, cutting and packing can be carried out in perfect flow communication with each other.

The medium for printing sequential characters is selected from any medium where sequential printing of characters is required, preferably sheets, banknotes, securities and passports.

Further, as an exemplary embodiment the description of the wheels incorporating the ratchet and groove profiles for printing 50 up sheets is provided in the following tables. The details provided in the tables are better understood if read along the respective figures as indicated in the tables.

TABLE 4

| Numbering | Fig. Nos. of wheels Numbering box-wise for 50 UPS | | | | | |
|---|---|---|---|---|---|---|
| Box no. | Unit | $10^{th}$ | $100^{th}$ | 1000th | 10000th | 100000th |
| 1 | FIG. B1.1 | FIG. B1.2 | FIG. B1.22 | FIG. B1.23 | FIG. B1.16 | FIG. B1.17 |
| 2 | " | " | FIG. B1.4 | FIG. B1.24 | " | " |
| 3 | " | " | FIG. B1.5 | " | " | " |
| 4 | " | " | FIG. B1.6 | " | " | " |
| 5 | " | " | FIG. B1.7 | " | " | " |
| 6 | " | " | FIG. B1.8 | " | " | " |
| 7 | " | " | FIG. B1.9 | " | " | " |
| 8 | " | " | FIG. B1.10 | " | " | " |
| 9 | " | " | FIG. B1.11 | " | " | " |
| 10 | " | " | FIG. B1.12 | " | " | " |
| 11 | " | " | FIG. B1.22 | FIG. B1.25 | " | " |
| 12 | " | " | FIG. B1.4 | FIG. B1.26 | " | " |

TABLE 4-continued

| Numbering | Fig. Nos. of wheels Numbering box-wise for 50 UPS | | | | | |
|---|---|---|---|---|---|---|
| Box no. | Unit | $10^{th}$ | $100^{th}$ | 1000th | 10000th | 100000th |
| 13 | " | " | FIG. B1.5 | " | " | " |
| 14 | " | " | FIG. B1.6 | " | " | " |
| 15 | " | " | FIG. B1.7 | " | " | " |
| 16 | " | " | FIG. B1.8 | " | " | " |
| 17 | " | " | FIG. B1.9 | " | " | " |
| 18 | " | " | FIG. B1.10 | " | " | " |
| 19 | " | " | FIG. B1.11 | " | " | " |
| 20 | " | " | FIG. B1.12 | " | " | " |
| 21 | " | " | FIG. B1.22 | FIG. B1.27 | " | " |
| 22 | " | " | FIG. B1.4 | FIG. B1.28 | " | " |
| 23 | " | " | FIG. B1.5 | " | " | " |
| 24 | " | " | FIG. B1.6 | " | " | " |
| 25 | " | " | FIG. B1.7 | " | " | " |
| 26 | " | " | FIG. B1.8 | " | " | " |
| 27 | " | " | FIG. B1.9 | " | " | " |
| 28 | " | " | FIG. B1.10 | " | " | " |
| 29 | " | " | FIG. B1.11 | " | " | " |
| 30 | " | " | FIG. B1.12 | " | " | " |
| 31 | " | " | FIG. B1.22 | FIG. B1.29 | " | " |
| 32 | " | " | FIG. B1.4 | FIG. B1.30 | " | " |
| 33 | " | " | FIG. B1.5 | " | " | " |
| 34 | " | " | FIG. B1.6 | " | " | " |
| 35 | " | " | FIG. B1.7 | " | " | " |
| 36 | " | " | FIG. B1.8 | " | " | " |
| 37 | " | " | FIG. B1.9 | " | " | " |
| 38 | " | " | FIG. B1.10 | " | " | " |
| 39 | " | " | FIG. B1.11 | " | " | " |
| 40 | " | " | FIG. B1.12 | " | " | " |
| 41 | " | " | FIG. B1.22 | FIG. B1.31 | " | " |
| 42 | " | " | FIG. B1.4 | FIG. B1.32 | " | " |
| 43 | " | " | FIG. B1.5 | " | " | " |
| 44 | " | " | FIG. B1.6 | " | " | " |
| 45 | " | " | FIG. B1.7 | " | " | " |
| 46 | " | " | FIG. B1.8 | " | " | " |
| 47 | " | " | FIG. B1.9 | " | " | " |
| 48 | " | " | FIG. B1.10 | " | " | " |
| 49 | " | " | FIG. B1.11 | " | " | " |
| 50 | " | " | FIG. B1.12 | " | " | " |

TABLE 5

| Sl. No. Of | Fig. Nos. of wheels Numbering box-wise for 40 UPS | | | | | |
|---|---|---|---|---|---|---|
| Numbering Box | Unit | $10^{th}$ | 100th | 1000th | 10000th | 100000th |
| 1 | FIG. B1.1 | FIG. B1.2 | FIG. B1.3 | FIG. B1.18 | FIG. B1.16 | FIG. B1.17 |
| 2 | " | " | FIG. B1.4 | FIG. B1.19 | " | " |
| 3 | " | " | FIG. B1.5 | " | " | " |
| 4 | " | " | FIG. B1.6 | " | " | " |
| 5 | " | " | FIG. B1.7 | " | " | " |
| 6 | " | " | FIG. B1.8 | " | " | " |
| 7 | " | " | FIG. B1.9 | " | " | " |
| 8 | " | " | FIG. B1.10 | " | " | " |
| 9 | " | " | FIG. B1.11 | " | " | " |
| 10 | " | " | FIG. B1.12 | " | " | " |
| 11 | " | " | FIG. B1.3 | FIG. B1.20 | " | " |
| 12 | " | " | FIG. B1.4 | FIG. B1.21 | " | " |
| 13 | " | " | FIG. B1.5 | " | " | " |
| 14 | " | " | FIG. B1.6 | " | " | " |
| 15 | " | " | FIG. B1.7 | " | " | " |
| 16 | " | " | FIG. B1.8 | " | " | " |
| 17 | " | " | FIG. B1.9 | " | " | " |
| 18 | " | " | FIG. B1.10 | " | " | " |
| 19 | " | " | FIG. B1.11 | " | " | " |
| 20 | " | " | FIG. B1.12 | " | " | " |
| 21 | " | " | FIG. B1.3 | FIG. B1.18 | " | " |
| 22 | " | " | FIG. B1.4 | FIG. B1.19 | " | " |
| 23 | " | " | FIG. B1.5 | " | " | " |
| 24 | " | " | FIG. B1.6 | " | " | " |
| 25 | " | " | FIG. B1.7 | " | " | " |
| 26 | " | " | FIG. B1.8 | " | " | " |
| 27 | " | " | FIG. B1.9 | " | " | " |

TABLE 5-continued

| Sl. No. Of | Fig. Nos. of wheels Numbering box-wise for 40 UPS | | | | | |
|---|---|---|---|---|---|---|
| Numbering Box | Unit | $10^{th}$ | 100th | 1000th | 10000th | 100000th |
| 28 | " | " | FIG. B1.10 | " | " | " |
| 29 | " | " | FIG. B1.11 | " | " | " |
| 30 | " | " | FIG. B1.12 | " | " | " |
| 31 | " | " | FIG. B1.3 | FIG. B1.20 | " | " |
| 32 | " | " | FIG. B1.4 | FIG. B1.21 | " | " |
| 33 | " | " | FIG. B1.5 | " | " | " |
| 34 | " | " | FIG. B1.6 | " | " | " |
| 35 | " | " | FIG. B1.7 | " | " | " |
| 36 | " | " | FIG. B1.8 | " | " | " |
| 37 | " | " | FIG. B1.9 | " | " | " |
| 38 | " | " | FIG. B1.10 | " | " | " |
| 39 | " | " | FIG. B1.11 | " | " | " |
| 40 | " | " | FIG. B1.12 | " | " | " |

TABLE 6

| Sl. No. Of | Fig. Nos. of wheels Numbering box-wise for 20 UPS | | | | | |
|---|---|---|---|---|---|---|
| Numbering Box | Unit | $10^{th}$ | 100th | 1000th | 10000th | 100000th |
| 1 | FIG. B1.1 | FIG. B1.2 | FIG. B1.3 | FIG. B1.13 | FIG. B1.16 | FIG. B1.17 |
| 2 | " | " | FIG. B1.4 | FIG. B1.14 | " | " |
| 3 | " | " | FIG. B1.5 | " | " | " |
| 4 | " | " | FIG. B1.6 | " | " | " |
| 5 | " | " | FIG. B1.7 | " | " | " |
| 6 | " | " | FIG. B1.8 | " | " | " |
| 7 | " | " | FIG. B1.9 | " | " | " |
| 8 | " | " | FIG. B1.10 | " | " | " |
| 9 | " | " | FIG. B1.11 | " | " | " |
| 10 | " | " | FIG. B1.12 | " | " | " |
| 11 | " | " | FIG. B1.3 | FIG. B1.13 | " | " |
| 12 | " | " | FIG. B1.4 | FIG. B1.15 | " | " |
| 13 | " | " | FIG. B1.5 | " | " | " |
| 14 | " | " | FIG. B1.6 | " | " | " |
| 15 | " | " | FIG. B1.7 | " | " | " |
| 16 | " | " | FIG. B1.8 | " | " | " |
| 17 | " | " | FIG. B1.9 | " | " | " |
| 18 | " | " | FIG. B1.10 | " | " | " |
| 19 | " | " | FIG. B1.11 | " | " | " |
| 20 | " | " | FIG. B1.12 | " | " | " |

Electronic Verification System

Due to excess contact pressure between inking roller and wheels, wrong rotation of wheel(s) may occur, causing wrong numbering. It may continue if there is no on-line checking system. To avoid an error in the printing sequence, a suitable electronic verification system is implemented in the present invention.

As the prefix wheels are fixed for all sheets to be printed, these prefix wheels are locked and no automatic verification system is essential for them. By referring to FIG. 2, each wheel normally contains ten numeric characters. Ten discrete patterns are to be generated to identify the printing face. In binary system minimum 4 bits encoder per wheel can do the job successfully. Due to space constraints three-state magnets (North Pole (N), South Pole (S) and without pole (say O)) are used. As stated below, reading any three magnetic positions can generate 27 different states.

TABLE 7

| SL. NO | Orientation of Magnetic Pole |
|---|---|
| 1 | N S N |
| 2 | O N S |
| 3 | S O N |
| 4 | O S O |

TABLE 7-continued

| SL. NO | Orientation of Magnetic Pole |
|---|---|
| 5 | N O S |
| 6 | O N O |
| 7 | O O N |
| 8 | S O O |
| 9 | N S O |
| 10 | S N S |
| 11 | O O O |
| 12 | O O S |
| 13 | O S N |
| 14 | S N N |
| 15 | N N S |
| 16 | N S S |
| 17 | S S S |
| 18 | S S N |
| 19 | S N O |
| 20 | N O O |
| 21 | O N N |
| 22 | O S S |
| 23 | N N O |
| 24 | N N N |
| 25 | S O S |
| 26 | S S O |
| 27 | N O N |

Among 27 states two sets of ten discrete states (SL. No. 1-10 and SL. No. 11-20) are highlighted on the above table. Any other permutation (having ring counter in nature) can be formed and used in suitable application. Magnetic poles/blank (O) may be incorporated in gap between two digits on the wheel as shown in the drawing of wheel by putting arrow. It may be also cleared that any magnetic orientation of pole can be used for any digit on wheel. Hence, by this method each position out of ten positions of wheel is detected.

For example, the 1$^{st}$ set of magnetic orientation can be used to identify the printing face as stated in Table 8

TABLE 8

| Printing Face | Magnetic orientation |
|---|---|
| 0 | N S N |
| 1 | O N S |
| 2 | S O N |
| 3 | O S O |
| 4 | N O S |
| 5 | O N O |
| 6 | O O N |
| 7 | S O O |
| 8 | N S O |
| 9 | S N S |

The three Hall Effect Sensors that are disposed on the numbering box, are used to detect the orientation of the magnetic pole of each wheel. These sensors may be fixed at any suitable place to read successive magnetic poles on the wheel to detect digit, which is going to be printed as shown in FIG. 2. After reading magnetic orientation of all numeric wheels of each box (except prefix wheels), the processing unit generates numbering pattern of each box, which is going to be printed. These numbering patterns of all boxes are compared with the predefined input data according to numbering system in used. Hence, any wrong rotation of any wheel can be detected by applying the verification system and the machine is stopped for further corrective action.

The method for the printing of sequential characters can be explained with the help of the following examples:

EXAMPLE 1

Method of Printing Sequential Characters for 50 Up Sheets and the Corresponding Numbering Boxes are Explained Below Numbering boxes used for numbering of 50 up sheet is mentioned in Table 1. The arrangement of the numbering boxes depends on the delivery schedule of the packets in the cutting machine.

The printing of numbers follows the backward printing of numbers. In this system 50 continuous numbered packet (10×5 packets=5 bundles) are obtained after processing 100 sheets in the cutting and packing machines and subsequent bundles received after processing of next block. The pattern is followed for all the packets.

Structure of wheels:

Digits mentioned in the Table-4 are printed on the printing face.

Unit wheel: Unit wheel of every position is identical in nature. It will rotate after every impression.

TABLE A1

| Numbering Box no | Digits on the wheel | Actuation of 10$^{th}$ wheel | Drawing No. |
|---|---|---|---|
| 1 to 50 | 0, 9, 8, 7, 6, 5, 4, 3, 2, 1 | Every change over from “0” to “9” of unit wheel | B1.1 |

10$^{th}$ Wheel: 10$^{th}$ wheel of all boxes is similar. It will rotate at the change over of unit wheel from “0” to “9”.

TABLE B1

| Numbering Box no | Digits on the wheel | Actuation of 100$^{th}$ wheel | Drawing No. |
|---|---|---|---|
| 1 to 50 | 0, 9, 8, 7, 6, 5, 4, 3, 2, 1 | When 10$^{th}$ wheel holds “0” | B1.2 |

100$^{th}$ Wheel: It will only rotate along with unit wheel, when 10$^{th}$ wheel holds digit “0”. Every wheel contains with two digits as shown below.

TABLE C1

| Numbering Box no | Digits on the wheel | Actuation of 1000$^{th}$ wheel | Figure |
|---|---|---|---|
| 1, 11, 21, 31, 41 | 0, 9, 9, 9, 9, 9, 9, 9, 9, 9 | Every change over from “0” to “9” and “9” to “0” digit of 100$^{th}$ wheel and thrice additional rotation along with “9” of 100$^{th}$ wheel. | B1.22 |
| 2, 12, 22, 32, 42 | 9, 8, 8, 8, 8, 8, 8, 8, 8, 8 | Every change over from “n” to “n + 1” digit of 100$^{th}$ wheel (where n = 0, 1, 2, 3, 4, 5, 6, 7, 8) | B1.4 |
| 3, 13, 23, 33, 43 | 8, 7, 7, 7, 7, 7, 7, 7, 7, 7 | | B1.5 |
| 4, 14, 24, 34, 44 | 7, 6, 6, 6, 6, 6, 6, 6, 6, 6 | | B1.6 |
| 5, 15, 25, 35, 45 | 6, 5, 5, 5, 5, 5, 5, 5, 5, 5 | | B1.7 |
| 6, 16, 26, 36, 46 | 5, 4, 4, 4, 4, 4, 4, 4, 4, 4 | | B1.8 |
| 7, 17, 27, 37, 47 | 4, 3, 3, 3, 3, 3, 3, 3, 3, 3 | | B1.9 |
| 8, 18, 28, 38, 48 | 3, 2, 2, 2, 2, 2, 2, 2, 2, 2 | | B1.10 |
| 9, 19, 29, 39, 49 | 2, 1, 1, 1, 1, 1, 1, 1, 1, 1 | | B1.11 |
| 10, 20, 30, 40, 50 | 1, 0, 0, 0, 0, 0, 0, 0, 0, 0 | | B1.12 |

TABLE D1

| 1000$^{th}$ wheel: | | | |
|---|---|---|---|
| Numbering Box no | Digits on the 1000$^{th}$ wheel | Actuation of 10,000$^{th}$ wheel | Figure |
| 1 | 0, 9, 9, 9, 9, 5, 4, 4, 4, 4 | Every change over from “0” to “9” digit of 1000$^{th}$ wheel | B1.23 |
| 2 to 10 | 9, 4, 9, 4, 9, 4, 9, 4, 9, 4 | Every change over from “4” to “9” digit of 1000$^{th}$ wheel | B1.24 |
| 11 | 9, 8, 8, 8, 8, 4, 3, 3, 3, 3 | Every change over from “3” to “9” digit of 1000$^{th}$ wheel | B1.25 |
| 12 to 20 | 8, 3, 8, 3, 8, 3, 8, 3, 8, 3 | Every change over from “3” to “8” digit of 1000$^{th}$ wheel | B1.26 |
| 21 | 8, 7, 7, 7, 7, 3, 2, 2, 2, 2 | Every change over from “2” to “8” digit of 1000$^{th}$ wheel | B1.27 |
| 22 to 30 | 7, 2, 7, 2, 7, 2, 7, 2, 7, 2 | Every change over from “2” to “7” digit of 1000$^{th}$ wheel | B1.28 |

TABLE D1-continued

| Numbering Box no | Digits on the $1000^{th}$ wheel | Actuation of $10{,}000^{th}$ wheel | Figure |
|---|---|---|---|
| | $1000^{th}$ wheel: | | |
| 31 | 7, 6, 6, 6, 6, 2, 1, 1, 1, 1 | Every change over from "1" to "7" digit of $1000^{th}$ wheel | B1.29 |
| 32 to 40 | 6, 1, 6, 1, 6, 1, 6, 1, 6, 1 | Every change over from "1" to "6" digit of $1000^{th}$ wheel | B1.30 |
| 41 | 6, 5, 5, 5, 5, 1, 0, 0, 0, 0 | Every change over from "0" to "6" digit of $1000^{th}$ wheel | B1.31 |
| 42 to 50 | 5, 0, 5, 0, 5, 0, 5, 0, 5, 0 | Every change over from "0" to "5" digit of $1000^{th}$ wheel | B1.32 |

TABLE E1

| Numbering Box no | Digits on the wheel | Actuation of $100{,}000^{th}$ wheel | Figure |
|---|---|---|---|
| | $10{,}000^{th}$ wheel: | | |
| 1 to 50 | 0, 9, 8, 7, 6, 5, 4, 3, 2, 1 | Every change over from "0" to "9" digit of $10{,}000^{th}$ wheel | B1.16 |

$100{,}000^{th}$ Wheel: $100{,}000^{th}$ wheel of every position is identical in nature. It contains with "0,9,8,7,6,5,4,3,2,1" digits.

TABLE F1

| Numbering Box no | Digits on the wheel | Actuation of $1000{,}000^{th}$ wheel | Figure |
|---|---|---|---|
| 1 to 50 | 0, 9, 8, 7, 6, 5, 4, 3, 2, 1 | Every change over from "0" to "9" digit of $10{,}000^{th}$ wheel (If there is any wheel). | B1.17 |

To print more than one million pieces, extra wheels like $100{,}000^{th}$ wheel need to be incorporated. In the last wheel no groove is required.

EXAMPLE 2

Numbering boxes used for numbering of 40 up sheet is mentioned in Table 9. The arrangement of the numbering boxes depends on the delivery schedule of the packets in the cutting machine.

The printing of numbers follows the backward printing of numbers. In this system 40 continuous numbered packet (10×4 packets=4 bundles) are obtained after processing 100 sheets in the cutting and packing machines and subsequent bundles received after processing of next block. The pattern is followed for all the packets.

TABLE 9

| | | | | |
|---|---|---|---|---|
| Box no.- 40 | Box no.- 32 | Box no.- 24 | Box no.- 16 | Box no.- 8 |
| Box no.- 39 | Box no.- 31 | Box no.- 23 | Box no.- 15 | Box no.- 7 |
| Box no.- 38 | Box no.- 30 | Box no.- 22 | Box no.- 14 | Box no.- 6 |
| Box no.- 37 | Box no.- 29 | Box no.- 21 | Box no.- 13 | Box no.- 5 |
| Box no.- 36 | Box no.- 28 | Box no.- 20 | Box no.- 12 | Box no.- 4 |
| Box no.- 35 | Box no.- 27 | Box no.- 19 | Box no.- 11 | Box no.- 3 |
| Box no.- 34 | Box no.- 26 | Box no.- 18 | Box no.- 10 | Box no.- 2 |
| Box no.- 33 | Box no.- 25 | Box no.- 17 | Box no.- 9 | Box no.- 1 |

Structure of Wheels:

Digits mentioned in the Table-5 are printed on the printing face.

Unit wheel: Unit wheel of every position is identical in nature. It will rotate after every impression.

TABLE A2

| Numbering Box no | Digits on the wheel | Actuation of $10^{th}$ wheel | Drawing No. |
|---|---|---|---|
| 1 to 40 | 0, 9, 8, 7, 6, 5, 4, 3, 2, 1 | Every change over from "0" to "9" of unit wheel | FIG. B1.1 |

$10^{th}$ Wheel: $10^{th}$ wheel of all boxes is similar. It will rotate at the change over of unit wheel from "0" to "9".

TABLE B2

| Numbering Box no | Digits on the wheel | Actuation of $100^{th}$ wheel | Drawing No. |
|---|---|---|---|
| 1 to 40 | 0, 9, 8, 7, 6, 5, 4, 3, 2, 1 | When $10^{th}$ wheel holds "0" | FIG. B1.2 |

$100^{th}$ Wheel: $100^{th}$ wheel of every position is identical in nature. It will only rotate along with unit wheel, when $10^{th}$ wheel holds digit "0". Every wheel contains with two digits as shown below.

TABLE C2

| Numbering Box no | Digits on the wheel | Actuation of $1000^{th}$ wheel | Drawing No. |
|---|---|---|---|
| 1, 11, 21, 31 | 0, 9, 9, 9, 9, 9, 9, 9, 9, 9 | Every change over from "0" to "9" and "9" to "0" digit of $100^{th}$ wheel | FIG. B1.3 |
| 2, 12, 22, 32 | 9, 8, 8, 8, 8, 8, 8, 8, 8, 8 | Every change over from "n" to "n + 1" digit of $100^{th}$ wheel | FIG. B1.4 |
| 3, 13, 23, 33 | 8, 7, 7, 7, 7, 7, 7, 7, 7, 7 | (where n = 0, 1, 2, 3, 4, 5, 6, 7, 8) | FIG. B1.5 |
| 4, 14, 24, 34 | 7, 6, 6, 6, 6, 6, 6, 6, 6, 6 | | FIG. B1.6 |
| 5, 15, 25, 35 | 6, 5, 5, 5, 5, 5, 5, 5, 5, 5 | | FIG. B1.7 |
| 6, 16, 26, 36 | 5, 4, 4, 4, 4, 4, 4, 4, 4, 4 | | FIG. B1.8 |
| 7, 17, 27, 37 | 4, 3, 3, 3, 3, 3, 3, 3, 3, 3 | | FIG. B1.9 |
| 8, 18, 28, 38 | 3, 2, 2, 2, 2, 2, 2, 2, 2, 2 | | FIG. B1.10 |
| 9, 19, 29, 39 | 2, 1, 1, 1, 1, 1, 1, 1, 1, 1 | | FIG. B1.11 |
| 10, 20, 30, 40 | 1, 0, 0, 0, 0, 0, 0, 0, 0, 0 | | FIG. B1.12 |

TABLE D2

| Numbering Box no | Digits on the $1000^{th}$ wheel | Actuation of $10{,}000^{th}$ wheel | Figure |
|---|---|---|---|
| | $1000^{th}$ wheel: | | |
| 1 | 0, 9, 9, 9, 9, 5, 4, 4, 4, 4 | Every change over from "0" to "9" digit of $1000^{th}$ wheel | B1.23 |
| 2 to 10 | 9, 4, 9, 4, 9, 4, 9, 4, 9, 4 | Every change over from "4" to "9" digit of $1000^{th}$ wheel | B1.24 |
| 11 | 9, 8, 8, 8, 8, 4, 3, 3, 3, 3 | Every change over from "3" to "9" digit of $1000^{th}$ wheel | B1.25 |
| 12 to 20 | 8, 3, 8, 3, 8, 3, 8, 3, 8, 3 | Every change over from "3" to "8" digit of $1000^{th}$ wheel | B1.26 |
| 21 | 8, 7, 7, 7, 7, 3, 2, 2, 2, 2 | Every change over from "2" to "8" digit of $1000^{th}$ wheel | B1.27 |
| 22 to 30 | 7, 2, 7, 2, 7, 2, 7, 2, 7, 2 | Every change over from "2" to "7" digit of $1000^{th}$ wheel | B1.28 |

TABLE D2-continued

| Numbering Box no | Digits on the $1000^{th}$ wheel | Actuation of $10{,}000^{th}$ wheel | Figure |
|---|---|---|---|
| | $1000^{th}$ wheel: | | |
| 31 | 7, 6, 6, 6, 6, 2, 1, 1, 1, 1 | Every change over from "1" to "7" digit of $1000^{th}$ wheel | B1.29 |
| 32 to 40 | 6, 1, 6, 1, 6, 1, 6, 1, 6, 1 | Every change over from "1" to "6" digit of $1000^{th}$ wheel | B1.30 |
| 41 | 6, 5, 5, 5, 5, 1, 0, 0, 0, 0 | Every change over from "0" to "6" digit of $1000^{th}$ wheel | B1.31 |
| 42 to 50 | 5, 0, 5, 0, 5, 0, 5, 0, 5, 0 | Every change over from "0" to "5" digit of $1000^{th}$ wheel | B1.32 |

TABLE E2

| Numbering Box no | Digits on the wheel | Actuation of $100{,}000^{th}$ wheel | Figure |
|---|---|---|---|
| | $10{,}000^{th}$ wheel: | | |
| 1 to 50 | 0, 9, 8, 7, 6, 5, 4, 3, 2, 1 | Every change over from "0" to "9" digit of $10{,}000^{th}$ wheel | B1.16 |

$100{,}000^{th}$ Wheel: $100{,}000^{th}$ wheel of every position is identical in nature. It contains with "0,9,8,7,6,5,4,3,2,1" digits.

TABLE F2

| Numbering Box no | Digits on the wheel | Actuation of $1000{,}000^{th}$ wheel | Figure |
|---|---|---|---|
| 1 to 50 | 0, 9, 8, 7, 6, 5, 4, 3, 2, 1 | Every change over from "0" to "9" digit of $10{,}000^{th}$ wheel (If there is any wheel). | B1.17 |

To print more than one million pieces, extra wheels like $100{,}000^{th}$ wheel need to be incorporated. In the last wheel no groove is required.

EXAMPLE 3

Method of Printing Sequential Characters for 20 Up Sheets and the Corresponding Numbering Boxes are Explained Below

TABLE 10

| | |
|---|---|
| Box no.- 20 | Box no.- 10 |
| Box no.- 19 | Box no.- 9 |
| Box no.- 18 | Box no.- 8 |
| Box no.- 17 | Box no.- 7 |
| Box no.- 16 | Box no.- 6 |
| Box no.- 15 | Box no.- 5 |
| Box no.- 14 | Box no.- 4 |
| Box no.- 13 | Box no.- 3 |
| Box no.- 12 | Box no.- 2 |
| Box no.- 11 | Box no.- 1 |

Structure of wheels:

Unit wheel: Unit wheel of every position is identical in nature. It will rotate after every impression.

TABLE A3

| Numbering Box no | Digits on the wheel | Actuation of $10^{th}$ wheel | Drawing No. |
|---|---|---|---|
| 1 to 20 | 0, 9, 8, 7, 6, 5, 4, 3, 2, 1 | Every change over from "0" to "9" of unit wheel | B1.1 |

$10^{th}$ Wheel: $10^{th}$ wheel of all boxes is similar. It will rotate at the change over of unit wheel from "0" to "9".

TABLE B3

| Numbering Box no | Digits on the wheel | Actuation of $100^{th}$ wheel | Drawing No. |
|---|---|---|---|
| 1 to 20 | 0, 9, 8, 7, 6, 5, 4, 3, 2, 1 | When $10^{th}$ wheel holds "0" | B1.2 |

$100^{th}$ Wheel: $100^{th}$ wheel of every position is identical in nature. It will only rotate along with unit wheel, when $10^{th}$ wheel holds digit "0". Every wheel contains with two digits as shown below.

TABLE C3

| Numbering Box no | Digits on the wheel | Actuation of $1000^{th}$ wheel | Drawing No. |
|---|---|---|---|
| 1, 11 | 0, 9, 9, 9, 9, 9, 9, 9, 9, 9 | Every change over from "0" to "9" and "9" to "0" digit of $100^{th}$ wheel | B1.3 |
| 2, 12 | 9, 8, 8, 8, 8, 8, 8, 8, 8, 8 | Every change over from "n" to "n + 1" | B1.4 |
| 3, 13 | 8, 7, 7, 7, 7, 7, 7, 7, 7, 7 | digit of $100^{th}$ wheel (where n = 0, 1, 2, 3, | B1.5 |
| 4, 14 | 7, 6, 6, 6, 6, 6, 6, 6, 6, 6 | 4, 5, 6, 7, 8) | B1.6 |
| 5, 15 | 6, 5, 5, 5, 5, 5, 5, 5, 5, 5 | | B1.7 |
| 6, 16 | 5, 4, 4, 4, 4, 4, 4, 4, 4, 4 | | B1.8 |
| 7, 17 | 4, 3, 3, 3, 3, 3, 3, 3, 3, 3 | | B1.9 |
| 8, 18 | 3, 2, 2, 2, 2, 2, 2, 2, 2, 2 | | B1.10 |
| 9, 19 | 2, 1, 1, 1, 1, 1, 1, 1, 1, 1 | | B1.11 |
| 10, 20 | 1, 0, 0, 0, 0, 0, 0, 0, 0, 0 | | B1.12 |

TABLE D3

| Numbering Box no | Digits on the wheel | Actuation of $10{,}000^{th}$ wheel | Drawing No. |
|---|---|---|---|
| | $1000^{th}$ wheel: | | |
| 1, 11 | 0, 9, 8, 7, 6, 5, 4, 3, 2, 1 | Every change over from "0" to "9" digit of $1000^{h}$ wheel | B1.13 |
| 2 to 10 | 9, 7, 5, 3, 1 | Every change over from "1" to "9" digit of $1000^{h}$ wheel | B1.14 |
| 12 to 20 | 8, 6, 4, 2, 0 | Every change over from "0" to "8 digit of $1000^{h}$ wheel | B1.15 |

TABLE E3

| | 10,000$^{th}$ wheel: | | |
|---|---|---|---|
| Numbering Box no | Digits on the wheel | Actuation of 100,000$^{th}$ wheel | Drawing No. |
| 1 to 20 | 0, 9, 8, 7, 6, 5, 4, 3, 2, 1 | Every change over from "0" to "9" digit of 10000$^{th}$ wheel | B1.16 |

100,000$^{th}$ Wheel: 100,000$^{th}$ wheel of every position is identical in nature. It contains with "0, 9, 8, 7, 6, 5, 4, 3, 2, 1" digits.

TABLE F3

| Numbering Box no | Digits on the wheel | Actuation of 1000,000$^{th}$ wheel | Drawing No. |
|---|---|---|---|
| 1 to 20 | 0, 9, 8, 7, 6, 5, 4, 3, 2, 1 | Every change over from "0" to "9" digit of 100,000$^{th}$ wheel (If there is any wheel). | B1.17 |

In order to print more than one million pieces, extra wheels like 100,000$^{th}$ wheel have to be incorporated.

Advantages

1. Using the method and apparatus of the present invention bundles of sheets are obtained after processing any ream and re-stacking is not required for further processing.

2. The method and apparatus of the present invention allows bundles to be available after processing of only one block (i.e. 100 sheets). Hence successive processing units may be started in a short time. This results in the complete process being completed faster.

3. The present invention ensures that no manual arrangement is required and that there can be complete automation between the processes of printing, cutting and packing.

4. In the present invention, due to single sheet cancellation, only a few bundles (e.g. 4 bundles for 40 ups etc) will be disturbed and are to be opened to correct manually.

5. The electronic verification system calibrated in the sequential printing system provides an online checking system to detect wrong numbering.

I claim:

1. A numbering box for carrying out sequential printing of numerical characters, wherein said numbering box comprises at least six numbering wheels with numbers engraved on the peripheral surface thereof, namely a unit wheel, a 10$^{th}$ wheel, a 100$^{th}$ wheel, a 1000$^{th}$ wheel, a 10000$^{th}$ wheel and a 100000$^{th}$ wheel, which numbering wheels are provided with combinations of ratchet and groove profiles on side surfaces thereof, and wherein said numbering wheels are actuated by an actuation lever which cooperates with said combinations of ratchet and groove profiles on the numbering wheels through first and second actuation pawls, said first actuation pawl being a two-teeth actuation pawl that cooperates with ratchet and groove profiles provided on the right side of the unit wheel and of the 10$^{th}$ wheel, said second actuation pawl being a five-teeth actuation pawl that cooperates with ratchet and groove profiles provided on the left side of the 10$^{th}$ wheel, 100$^{th}$ wheel, 1000$^{th}$ wheel, 10000$^{th}$ wheel and 100000$^{th}$ wheel.

2. A method for sequential printing of numerical characters on successive sheets each bearing a plurality of locations to be numbered, which locations are arranged in a matrix of maximum rows (mr) and of maximum columns (mc), wherein product mr×mc is a multiple of ten, said method comprising the steps of:

(a) providing mr×mc sequential numbering boxes as defined in claim 1 each having a plurality of numbering wheels;

(b) arranging said numbering boxes in a matrix of maximum rows (mr) and of maximum columns (mc) corresponding to the matrix of locations to be numbered on the sheets, a first of said numbering boxes being located at matrix location (mr ; mc), a second of said numbering boxes being located at matrix location (mr−1 ; mc), and so on until a last one of said numbering boxes is located at matrix location (1 ; 1);

(c) setting the position of the numbering wheels of the numbering boxes to form determined sequences of numerical characters so that adjacent numbering boxes exhibit sequences of numerical characters with a value difference of 100 row wise and a value difference of mr×100 column wise;

(d) printing a first one of a series of hundred sheets with said numbering boxes, thereby printing said sequences of numerical characters on said locations on the sheet;

(e) actuating all said numbering boxes so that all the sequences of numerical characters formed by said numbering wheels are decremented by one;

(f) printing a subsequent sheet with said numbering boxes, thereby printing said sequences of numerical characters decremented by one on said locations on the second sheet;

(g) repeating steps (e) and (f) until hundred sheets have been printed;

(h) resetting the position of the numbering wheels of the numbering boxes, so that the sequences of numerical characters formed by the numbering boxes correspond respectively to the sequences of numerical characters at the time of the printing of the first of the series of hundred sheets at step (d) decremented by a value of mr×mc×100;

(i) repeating steps (d) to (h) for subsequent series of hundred sheets.

3. The method as claimed in claim 2, wherein each sheet carries a matrix of fifty locations and wherein mr and mc can be selected from any one of the following matrix combinations (mr=5; mc=10), (mr=10; mc=5), (mr=25; mc=2), or (mr=2; mc=25).

4. The method as claimed in claim 3, wherein mr=10 and mc=5.

5. The method as claimed in claim 2, wherein each sheet carries a matrix of forty locations and wherein mr and mc can be selected from any one of the following matrix combinations (mr=5; mc=8), (mr=8; mc=5), (mr=10; mc=4), (mr=4; mc=10), (mr=20; mc=2), or (mr=2; mc=20).

6. The method as claimed in claim 5, wherein mr=8 and mc=5.

7. The method as claimed in claim 2, wherein each sheet carries a matrix of twenty locations and wherein mr and mc can be selected from any one of the following matrix combinations (mr=2; mc=10), (mr=10; mc=2), (mr=5; mc=4), or (mr=4; mc=5).

8. The method as claimed in claim 7, wherein mr=10 and mc=2.

9. The method according to claim 2, wherein said sheets are sheets for the production of banknotes, securities or passports.

* * * * *